(12) United States Patent
Matsumoto et al.

(10) Patent No.: US 9,624,804 B2
(45) Date of Patent: Apr. 18, 2017

(54) ABNORMALITY DIAGNOSIS DEVICE FOR A SENSOR

(71) Applicant: TOYOTA JIDOSHA KABUSHIKI KAISHA, Toyota-shi, Aichi (JP)

(72) Inventors: Arifumi Matsumoto, Gotenba (JP); Tomoyuki Kogo, Gotenba (JP); Taiga Hagimoto, Susono (JP); Kenji Furui, Susono (JP); Akifumi Uozumi, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/024,189

(22) PCT Filed: Sep. 24, 2014

(86) PCT No.: PCT/JP2014/075329
§ 371 (c)(1),
(2) Date: Mar. 24, 2016

(87) PCT Pub. No.: WO2015/046276
PCT Pub. Date: Apr. 2, 2015

(65) Prior Publication Data
US 2016/0215669 A1    Jul. 28, 2016

(30) Foreign Application Priority Data

Sep. 25, 2013  (JP) .................................. 2013-198766

(51) Int. Cl.
*F01N 3/00*  (2006.01)
*F01N 3/20*  (2006.01)
(Continued)

(52) U.S. Cl.
CPC ......... *F01N 3/2066* (2013.01); *F01N 3/0842* (2013.01); *F01N 11/00* (2013.01);
(Continued)

(58) Field of Classification Search
USPC .......... 60/274, 276, 277, 286, 297, 301, 303
See application file for complete search history.

(56) References Cited

U.S. PATENT DOCUMENTS 7,757,478 B2 * 7/2010 Wang .................... F01N 3/2066
60/285
9,010,087 B1 * 4/2015 Upadhyay ............... F01N 3/208
60/274

(Continued)

FOREIGN PATENT DOCUMENTS

| JP | 2009-185754 | 8/2009 |
| JP | 2011-94540  | 5/2011 |
| JP | 2011-220126 | 11/2011 |

*Primary Examiner* — Binh Q Tran
(74) *Attorney, Agent, or Firm* — Finnegan, Henderson, Farabow, Garrett & Dunner, LLP

(57) ABSTRACT

An incorrect or wrong diagnosis in abnormality diagnosis of a sensor is suppressed. Provided at the downstream side of an NOx selective reduction catalyst is a sensor which detects NOx and ammonia in an exhaust gas flowing out of the NOx selective reduction catalyst, and in which the NOx and the ammonia react with each other. An amount of decrease in an output of the sensor due to a reaction of the NOx and the ammonia in the sensor is calculated based on the NOx and the ammonia flowing out of the NOx catalyst, and an abnormality diagnosis of the sensor is carried out based on this amount of decrease in the output of the sensor.

17 Claims, 12 Drawing Sheets

(51) Int. Cl.
*F01N 3/08* (2006.01)
*F01N 11/00* (2006.01)

(52) U.S. Cl.
CPC .... *F01N 2550/00* (2013.01); *F01N 2560/021* (2013.01); *F01N 2560/026* (2013.01); *F01N 2610/02* (2013.01); *F01N 2900/0412* (2013.01); *F01N 2900/0416* (2013.01); *F01N 2900/1402* (2013.01); *F01N 2900/1616* (2013.01); *F01N 2900/1621* (2013.01); *Y02T 10/24* (2013.01)

(56) References Cited

U.S. PATENT DOCUMENTS

| | | | | |
|---|---|---|---|---|
| 9,038,373 | B2* | 5/2015 | Geveci | F01N 3/208 60/295 |
| 9,453,451 | B2* | 9/2016 | Matsumoto | F01N 11/007 |
| 2011/0099977 | A1 | 5/2011 | Takahashi | |
| 2011/0239628 | A1 | 10/2011 | Tanioka | |
| 2014/0373511 | A1* | 12/2014 | Osburn | B01D 53/9431 60/274 |

* cited by examiner

AMOUNT OF DECREASE IN SENSOR OUTPUT

US 9,624,804 B2

ABNORMALITY DIAGNOSIS DEVICE FOR A SENSOR

CROSS-REFERENCE TO RELATED APPLICATIONS

This application is a national phase application of International Application No. PCT/JP2014/075329, filed Sep. 24, 2014, and claims the priority of Japanese Application No. 2013-198766, filed Sep. 25, 2013, the content of both of which is incorporated herein by reference.

TECHNICAL FIELD

The present invention relates to an abnormality diagnosis device for a sensor.

BACKGROUND ART

There has been known an NOx selective reduction catalyst (hereinafter, also referred to simply as an "NOx catalyst") which purifies (removes or reduces) NOx contained in an exhaust gas from an internal combustion engine by using ammonia as a reducing agent. Ammonia or a precursor (e.g., urea) of ammonia is supplied into the exhaust gas upstream of the NOx catalyst. In addition, when determining whether removal or reduction of NOx in the NOx catalyst is carried out normally, or when determining whether the NOx catalyst is normal, there may be used an output value of an NOx sensor that is arranged at a location downstream of the NOx catalyst.

Here, it is known that in cases where the output value of the NOx sensor arranged downstream of the NOx catalyst has a decreasing tendency, in spite of the fact that the amount of NOx flowing into the NOx catalyst has increased, it is judged that there occurs an ammonia slip in which ammonia flows out from the NOx catalyst, and that the amount of supply of ammonia is excessive (for example, refer to a first patent literature).

In this connection, note that the NOx sensor detects ammonia as well as NOx, so the output value of the NOx sensor becomes a value corresponding to an NOx concentration and an ammonia concentration in the exhaust gas. Then, it is also known that when a gas concentration is equal to or greater than a threshold value for starting a diagnosis, and when the internal combustion engine is in a state where fuel is not injected, the pressure in an exhaust passage is made to go up, and in cases where a subsequent gas concentration is equal to or greater than a predetermined value, a determination is made that the NOx sensor is abnormal (for example, refer to a second patent literature).

In addition, it is also known that rationality or normality of an NOx sensor is decided by determining whether a change over time of an output value of the NOx sensor has changed in correspondence to a predetermined amount of ammonia having flowed out to a downstream side of a reduction catalyst (for example, refer to a third patent literature).

PRIOR ART REFERENCES

Patent Literatures

[First Patent Literature] Japanese patent laid-open publication No. 2011-094540
[Second Patent Literature] Japanese patent laid-open publication No. 2011-220126
[Third Patent Literature] Japanese patent laid-open publication No. 2009-185754

SUMMARY OF THE INVENTION

Problems to be Solved by the Invention

Here, when NOx and ammonia exist in an exhaust gas flowing into an NOx sensor, NOx will be reduced by ammonia in the NOx sensor. In this NOx, there are included NOx which has been contained in the exhaust gas at the upstream side of the NOx sensor, and NOx which has been generated by the oxidation of ammonia in the NOx sensor. Then, due to the reaction of NOx and ammonia in the NOx sensor, the NOx and the ammonia decrease. Thus, the output value of the NOx sensor becomes a value corresponding to the remaining NOx and ammonia after the NOx and the ammonia have decreased. Accordingly, the output value of the NOx sensor can become lower than the concentrations of NOx and ammonia in the exhaust gas existing in the vicinity of the NOx sensor.

In this manner, in cases where NOx and ammonia exist in the exhaust gas, there is a fear that the output value of the NOx sensor may become a value different from the actual concentrations of NOx and ammonia. Accordingly, when an abnormality diagnosis of the NOx sensor is carried out based on the output value of the NOx sensor in the presence of NOx and ammonia in the exhaust gas, there is a fear that diagnostic accuracy may become low.

The present invention has been made in view of the problems as referred to above, and the object of the present invention is to suppress an incorrect or wrong diagnosis in the abnormality detection of a sensor.

Means for Solving the Problems

In order to achieve the above-mentioned object, the present invention resides in an abnormality diagnosis device for a sensor in an exhaust gas purification apparatus of an internal combustion engine, which is provided with:

an NOx selective reduction catalyst that is arranged in an exhaust passage of the internal combustion engine and uses ammonia as a reducing agent;

an injection valve configured to supply ammonia or a precursor of ammonia into an exhaust gas flowing into said NOx selective reduction catalyst, at a location upstream of said NOx selective reduction catalyst; and a sensor that is arranged at the downstream side of said NOx selective reduction catalyst, and configured to detect NOx and ammonia in an exhaust gas flowing out of said NOx selective reduction catalyst, with the NOx and the ammonia reacting with each other therein;

wherein said abnormality diagnosis device comprises:
a controller comprising at least one processor configured to estimate a concentration of NOx in the exhaust gas flowing out of said NOx selective reduction catalyst;

estimate a concentration of ammonia in the exhaust gas flowing out of said NOx selective reduction catalyst;

calculate an amount of decrease in an output of said sensor due to a reaction of NOx and ammonia in said sensor, based on the NOx concentration estimated by said NOx concentration estimation unit and the ammonia concentration estimated by said controller;

carry out a diagnosis of said sensor based on an output value of said sensor; and control the diagnosis in said controller based on the amount of decrease in the output of said sensor calculated by said controller.

The NOx catalyst adsorbs ammonia in the exhaust gas, and selectively reduces NOx by using the ammonia as the reducing agent. The injection valve supplies ammonia or a precursor (e.g., urea) of ammonia. The ammonia having flowed into the NOx catalyst is adsorbed, for example, by said NOx catalyst.

Here, the sensor for detecting the NOx in the exhaust gas flowing out of said NOx catalyst is arranged at the downstream side of the NOx catalyst. This sensor is affected by interference of ammonia. That is, in cases where ammonia is contained in the exhaust gas, the sensor has the characteristic of detecting the ammonia as NOx, too. Accordingly, the output value of the sensor is based on the NOx and the ammonia which are contained in the exhaust gas. Even in cases where NOx and ammonia exist in the exhaust gas, the abnormality diagnosis of the sensor is carried out. The "abnormality" referred to herein means a case where a shift or deviation of the output value of the sensor from actual concentrations of NOx and ammonia (i.e., a sum of an actual concentration of NOx and an actual concentration of ammonia in the exhaust gas) exceeds an allowable range, for example. This abnormality of the sensor includes offset abnormality, gain abnormality, a response delay, and so on.

Here, there may also exist NOx and ammonia in the vicinity of the sensor. These NOx and ammonia are detected by the sensor. However, in the sensor, NOx and ammonia react with each other, so the amounts of NOx and ammonia decrease, and the output value of the sensor accordingly decreases. As a result of this, the concentration detected by the sensor becomes lower than the actual concentrations of NOx and ammonia. In this case, the NOx reduction rate calculated based on the output value of the sensor becomes apparently high. For this reason, if an abnormality diagnosis is carried out based on the output value of the sensor, or the NOx reduction rate calculated based on the output value of the sensor, after the output value of the sensor has decreased, there will be a fear that diagnostic accuracy may become low.

Accordingly, the controller controls the diagnosis in the controller based on the amount of decrease in the output of the sensor. Here, the amount of decrease in the output of the sensor is associated with the concentrations of NOx and ammonia flowing out of the NOx catalyst. For this reason, the amount of decrease in the output of the sensor can be obtained based on the concentrations of NOx and ammonia flowing out of the NOx catalyst. Then, threshold values or various kinds of values, which are used at the time of abnormality diagnosis, can be corrected based on the amount of decrease in the output of the sensor. In addition, based on the amount of decrease in the output of the sensor, it can also be determined whether an abnormality diagnosis is to be carried out. As a result of this, it is possible to improve the accuracy of the abnormality diagnosis of the sensor. Here, note that controlling the diagnosis in the controller includes correcting the threshold values, correcting the output value of the sensor, correcting the NOx reduction rate calculated based on the output value of the sensor, or determining whether a diagnosis is carried out.

Then, said controller may carry out an abnormality diagnosis of said sensor in cases where an amount of rise in the NOx reduction rate calculated based on an amount of decrease in the output of said sensor calculated by said controller is equal to or less than a predetermined amount, but may not carry out the abnormality diagnosis of said sensor in cases where the amount of rise in the NOx reduction rate calculated based on the amount of decrease in the output of said sensor calculated by said controller is larger than said predetermined amount.

Here, the NOx reduction rate is a ratio of a concentration of NOx decreased by the reduction thereof in the NOx catalyst with respect to a concentration of NOx in the exhaust gas flowing into the NOx catalyst. The concentration of NOx in the exhaust gas flowing into the NOx catalyst can be detected, for example, by an estimation based on the operating state of the internal combustion engine, or by an NOx sensor mounted at the upstream side of the NOx catalyst. In addition, the concentration of NOx decreased by the reduction in the NOx catalyst can be obtained by subtracting the concentration of NOx, which is detected by the sensor arranged at the downstream side of the NOx catalyst, from the concentration of NOx in the exhaust gas flowing into the NOx catalyst. This sensor is affected by the influence of ammonia, so that the NOx reduction rate calculated based on the output value of the sensor is also affected by the influence of ammonia. Then, when the output value of the sensor decreases under the influence of NOx and ammonia contained in the exhaust gas, the NOx reduction rate thus calculated will rise or increase.

Here, the concentrations of NOx and ammonia flowing out of the NOx catalyst become high depending on an operating state of the internal combustion engine, and so, the amount of decrease in the output of the sensor calculated by the controller becomes large. Then, when the amount of decrease in the output of the sensor is large, the amount of rise in the NOx reduction rate calculated based on the output value of the sensor become large, and the NOx reduction rate calculated based on the actual output value of the sensor also becomes large. For example, in cases where abnormality occurs in which the output value of the sensor becomes larger than the actual concentration, the NOx reduction rate thus calculated may decrease apparently, but the amount of decrease in the output of the sensor becomes large under the influence of NOx and ammonia, the NOx reduction rate thus calculated will become large apparently, and will become close to a value at the time of normal operation of the sensor. On the other hand, when the amount of decrease in the sensor output is large even with the sensor being normal, the NOx reduction rate thus calculated will become large, and will become close to a value at the time of abnormal operation of the sensor. For this reason, the difference in the output value of the sensor between at the time of abnormal operation and at the time of normal operation thereof becomes small, so the accuracy in the abnormality diagnosis of the sensor can be reduced. Here, note that the condition that abnormality diagnosis is not carried out includes, for example, a case where although the output value of the sensor is read in, abnormality diagnosis is not carried out with the use of this output value. In addition, such a condition also includes, for example, a case where although abnormality diagnosis is carried out based on the output value of the sensor, the result of this diagnosis is canceled. Moreover, the condition further includes, for example, a case where the output value of the sensor is not read in.

In addition, as will be described later, in cases where a threshold value, etc., is changed based on the amount of rise in the NOx reduction rate, the larger the amount of decrease in the output of the sensor, the larger the amount of rise in the NOx reduction rate becomes, and the larger an amount of change of the threshold value also becomes. For example, in cases where, when the NOx reduction rate thus calculated is larger than the threshold value, a determination is made that abnormality has occurred in which the output value of the sensor becomes smaller than the actual concentrations of NOx and ammonia, there will be a fear that if the threshold value becomes too large, the NOx reduction rate at the time of abnormal operation of the sensor may become smaller than the threshold value. As a result of this, there will be a fear that despite the sensor being abnormal, it may be diagnosed that the sensor is normal. On the other hand, in cases where, when the NOx reduction rate thus calculated is smaller than the threshold value, a determination is made that abnormality has occurred in which the output value of the sensor becomes larger than the actual concentrations of NOx and ammonia, there will be a fear that if the threshold value becomes too large, the NOx reduction rate at the time of normal operation of the sensor may become smaller than the threshold value. As a result, there will be a fear that although the sensor is normal, it may be diagnosed that the sensor is abnormal. In such a case, if the abnormality diagnosis of the sensor is made not to be carried out, it will be possible to suppress a reduction in the accuracy of abnormality diagnosis. Here, note that the predetermined amount is decided in such a manner that the accuracy of the abnormality diagnosis of the sensor becomes within an allowable range.

Moreover, said controller may diagnose that said sensor is normal, in cases where the NOx reduction rate calculated based on the output value of said sensor is equal to or larger than a predetermined lower limit threshold value, and at the same time is equal to or less than a predetermined upper limit threshold value, which are decided based on the NOx concentration estimated by said controller and the ammonia concentration estimated by said controller, whereas said controller may diagnose that said sensor is abnormal, in cases where the NOx reduction rate calculated based on the output value of said sensor is smaller than said predetermined lower limit threshold value, or in cases where the NOx reduction rate calculated based on the output value of said sensor is larger than said predetermined upper limit threshold value;

said controller may correct at least one of said lower limit threshold value and said upper limit threshold value, based on the amount of decrease in the output of said sensor calculated by said controller.

When the NOx reduction rate calculated based on the actual output value of the sensor is close to the NOx reduction rate to be estimated, the controller diagnoses that the sensor is normal. The lower limit threshold value can be set to a lower limit value of an allowable range of the NOx reduction rate calculated based on the output value of the sensor. In addition, the upper limit threshold value can be set to an upper limit value of the allowable range of the NOx reduction rate calculated based on the output value of the sensor. Here, note that the lower limit threshold value and the upper limit threshold value may also be set to a lower limit value and an upper limit value, respectively, in a range of the NOx reduction rate calculated based on the output value of the sensor when the sensor is normal. Then, the controller carries out the abnormality diagnosis of the sensor by comparing the NOx reduction rate calculated based on the actual output value of the sensor with the lower limit threshold value or the upper limit threshold value. Here, in order to detect NOx and ammonia in the exhaust gas, the sensor causes the lower limit threshold value and the upper limit threshold value to change according to the sum value of the NOx concentration and the ammonia concentration in the exhaust gas in the vicinity of the sensor. That is, the lower limit threshold value and the upper limit threshold value are decided based on the NOx concentration estimated by the controller and the ammonia concentration estimated by the controller. The lower limit threshold value and the upper limit threshold value to be decided in this manner are a lower limit threshold value and an upper limit threshold value before correction thereof, respectively, with no consideration being given to the influence of the decrease in the output value of the sensor due to the reaction of NOx and ammonia.

For this reason, for example, when the output value of the sensor decreases due to the reaction of NOx and ammonia, in spite of the fact that an abnormality has occurred in which the output value of the sensor becomes large, the NOx reduction rate calculated based on the actual output value of the sensor can become equal to or larger than the predetermined lower limit threshold value, and at the same time equal to or less than the predetermined upper limit threshold value. In addition, although the sensor is normal, the NOx reduction rate calculated based on the actual output value of the sensor can become larger than the upper limit threshold value, due to the decrease in the output of the sensor. In other words, in cases where the output value of the sensor is decreased due to the reaction of NOx and ammonia, even if the abnormality diagnosis of the sensor is carried out with the use of the lower limit threshold value and the upper limit threshold value before correction, there will be a fear that accuracy may become low. In contrast to this, at least one of the lower limit threshold value and the upper limit threshold value is corrected based on the amount of decrease in the output of the sensor. If correction is made in this manner, the correction of the lower limit threshold value or the upper limit threshold value according to the amount of decrease in the output of the sensor will be made possible, as a result of which it is possible to enhance the accuracy of the abnormality diagnosis of the sensor.

Further, said controller can correct at least one of said lower limit threshold value and said upper limit threshold value by adding said amount of rise in the NOx reduction rate calculated based on said amount of decrease in the sensor output to the at least one of said lower limit threshold value and said upper limit threshold value.

That is, by increasing the lower limit threshold value or the upper limit threshold value by the amount of rise in the NOx reduction rate, the lower limit threshold value or the upper limit threshold value can be corrected according to the concentrations of NOx and ammonia in the exhaust gas. Here, note that the lower limit threshold value or the upper limit threshold value may be corrected by multiplying the lower limit threshold value or the upper limit threshold value by a correction coefficient based on the amount of rise in the NOx reduction rate.

Furthermore, said controller can diagnose that said sensor is normal, in cases where the NOx reduction rate calculated based on the output value of said sensor is equal to or larger than a predetermined lower limit threshold value, and at the same time is equal to or less than a predetermined upper limit threshold value, which are calculated based on the NOx concentration estimated by said controller and the ammonia concentration estimated by said controller, whereas said controller can diagnose that said sensor is abnormal, in cases where the NOx reduction rate calculated based on the output value of said sensor is smaller than said predetermined lower limit threshold value, or in cases where the NOx reduction rate calculated based on the output value of said sensor is larger than said predetermined upper limit threshold value;

said controller can correct said NOx reduction rate, based on the amount of decrease in the output of said sensor to be calculated by said controller.

That is, the NOx reduction rate may be corrected, instead of correcting at least one of the lower limit threshold value and the upper limit threshold value. In the case of correcting the NOx reduction rate, the NOx reduction rate is corrected in such a manner that it becomes smaller according to the decrease in the output of the sensor. Here, the actual output value of the sensor can become lower than the actual concentrations of NOx and ammonia flowing out of the NOx catalyst, due to the reaction of NOx and ammonia in the sensor. Accordingly, the NOx reduction rate calculated based on the output value of the sensor can become higher than the actual NOx reduction rate. In contrast to this, if the NOx reduction rate is corrected so as to be small based on the amount of decrease in the output of the sensor due to the reaction of NOx and ammonia, the NOx reduction rate will be calculated in a more accurate manner, as a result of which it will be possible to enhance the accuracy of the abnormality diagnosis of the sensor.

In addition, said controller can correct said NOx reduction rate by subtracting said amount of rise in the NOx reduction rate calculated based on said amount of decrease in the sensor output from the NOx reduction rate calculated based on the output value of said sensor.

That is, by decreasing the NOx reduction rate by the amount of rise in the NOx reduction rate, the NOx reduction rate can be corrected according to the concentrations of NOx and ammonia in the exhaust gas. Here, note that the NOx reduction rate may be corrected by multiplying the NOx reduction rate by a correction coefficient based on the amount of rise in the NOx reduction rate.

Moreover, said controller may diagnose that said sensor is normal, in cases where the NOx reduction rate calculated based on the output value of said sensor is equal to or less than a predetermined upper limit threshold value, which is decided based on the NOx concentration estimated by said controller and the ammonia concentration estimated by said controller, whereas said controller may diagnose that said sensor is abnormal, in cases where the NOx reduction rate calculated based on the output value of said sensor is larger than said predetermined upper limit threshold value;

said controller may correct said upper limit threshold value, based on the amount of decrease in the output of said sensor calculated by said controller.

Further, said controller may correct said upper limit threshold value by adding said amount of rise in the NOx reduction rate calculated based on said amount of decrease in the sensor output to said upper limit threshold value.

Furthermore, said controller may diagnose that said sensor is normal, in cases where the NOx reduction rate calculated based on the output value of said sensor is equal to or more than a predetermined lower limit threshold value, which is decided based on the NOx concentration estimated by said controller and the ammonia concentration estimated by said controller, whereas said controller may diagnose that said sensor is abnormal, in cases where the NOx reduction rate calculated based on the output value of said sensor is smaller than said predetermined lower limit threshold value;

said controller may correct said lower limit threshold value, based on the amount of decrease in the output of said sensor calculated by said controller.

In addition, said controller may correct said lower limit threshold value by adding said amount of rise in the NOx reduction rate calculated based on said amount of decrease in the sensor output to said lower limit threshold value.

Moreover, said controller may diagnose that said sensor is normal, in cases where the NOx reduction rate calculated based on the output value of said sensor is equal to or less than a predetermined upper limit threshold value, which is calculated based on the NOx concentration estimated by said controller and the ammonia concentration estimated by said controller, whereas said controller may diagnose that said sensor is abnormal, in cases where the NOx reduction rate calculated based on the output value of said sensor is larger than said predetermined upper limit threshold value;

said controller may correct said NOx reduction rate based on the amount of decrease in the output of said sensor calculated by said controller.

Further, said controller may diagnose that said sensor is normal, in cases where the NOx reduction rate calculated based on the output value of said sensor is equal to or more than a predetermined lower limit threshold value, which is calculated based on the NOx concentration estimated by said controller and the ammonia concentration estimated by said controller, whereas said controller may diagnose that said sensor is abnormal, in cases where the NOx reduction rate calculated based on the output value of said sensor is smaller than said predetermined lower limit threshold value;

said controller may correct said NOx reduction rate based on the amount of decrease in the output of said sensor calculated by said controller.

Furthermore, said controller may correct the output value of said sensor by subtracting the amount of rise in the NOx reduction rate calculated based on said amount of decrease in the sensor output from the NOx reduction rate calculated based on the output value of said sensor.

In addition, said controller may carry out an abnormality diagnosis of said sensor in cases where the amount of decrease in the output of said sensor calculated by said controller is equal to or less than a predetermined amount, whereas said controller may not carry out an abnormality diagnosis of said sensor in cases where the amount of decrease in the output of said sensor calculated by said controller is larger than said predetermined amount.

Here, the concentrations of NOx and ammonia flowing out of the NOx catalyst become high depending on an operating state of the internal combustion engine, and so, the amount of decrease in the output of the sensor calculated by the controller becomes large. Then, in cases where the amount of decrease in the output of the sensor is large, the actual output value of the sensor becomes small. For example, in cases where abnormality occurs in which the output value of the sensor becomes larger than the actual concentrations of NOx and ammonia, the amount of decrease in the sensor output becomes larger, so that the output value of the sensor approaches an output value which is to be taken at the time of normal operation of the sensor. In addition, when the amount of decrease in the sensor output is large even with the sensor being normal, the output value of the sensor will approach a value which is to be taken at the time of abnormal operation of the sensor. For this reason, the difference in the output value of the sensor between at the time of abnormal operation and at the time of normal operation thereof becomes small, so the accuracy in the abnormality diagnosis of the sensor can be reduced. The condition that abnormality diagnosis is not carried out includes, for example, a case where although the output value of the sensor is read in, abnormality diagnosis is not carried out with the use of this output value. In addition, such a condition also includes, for example, a case where although abnormality diagnosis is carried out based on the output value of the sensor, the result of this diagnosis is canceled. Moreover, the condition further includes, for example, a case where the output value of the sensor is not read in.

In addition, as described later, in cases where a threshold value, etc., is changed based on the amount of decrease in the output of the sensor, the larger the amount of decrease in the output of the sensor, the larger an amount of change of the threshold value also becomes. For example, in cases where the output value of the sensor is smaller than the threshold value, when a determination is made that abnormality has occurred in which the output value of the sensor becomes smaller than the actual concentrations of NOx and ammonia, there will be a fear that if the threshold value becomes too small, the sensor output at the time of abnormal operation of the sensor may become larger than the threshold value. As a result of this, there will be a fear that despite the sensor being abnormal, it may be diagnosed that the sensor is normal. On the other hand, for example, in cases where the output value of the sensor is larger than the threshold value, when a determination is made that abnormality has occurred in which the output value of the sensor becomes larger than the actual concentrations of NOx and ammonia, there will be a fear that when the threshold value becomes too small, the sensor output at the time of normal operation of the sensor may become larger than the threshold value. As a result, there will be a fear that although the sensor is normal, it may be diagnosed that the sensor is abnormal. In such a case, if the abnormality diagnosis of the sensor is made not to be carried out, it will be possible to suppress a reduction in the accuracy of abnormality diagnosis. Here, note that the predetermined amount is decided in such a manner that the accuracy of the abnormality diagnosis of the sensor becomes within an allowable range.

Moreover, said controller may diagnose that said sensor is normal, in cases where the output value of said sensor is equal to or larger than a predetermined lower limit threshold value, and at the same time is equal to or less than a predetermined upper limit threshold value, which are decided based on the NOx concentration estimated by said controller and the ammonia concentration estimated by said controller, whereas said controller may diagnose that said sensor is abnormal, in cases where the output value of said sensor is smaller than said predetermined lower limit threshold value, or in cases where the output value of said sensor is larger than said predetermined upper limit threshold value;

wherein said controller may correct at least one of said lower limit threshold value and said upper limit threshold value, based on the amount of decrease in the output of said sensor calculated by said controller.

When the actual output value of the sensor is close to the concentrations of NOx and ammonia to be estimated, the controller diagnoses that the sensor is normal. The lower limit threshold value can be set as a lower limit value of an allowable range of the output value of the sensor. In addition, the upper limit threshold value can be set as an upper limit value of the allowable range of the output value of the sensor. Here, note that the lower limit threshold value and the upper limit threshold value may also be set as a lower limit value and an upper limit value, respectively, in a range of the output value of the sensor when the sensor is normal. Then, the controller carries out the abnormality diagnosis of the sensor by making a comparison between the actual output value of the sensor with the lower limit threshold value or the upper limit threshold value. Here, in order to detect NOx and ammonia in the exhaust gas, the sensor causes the lower limit threshold value and the upper limit threshold value to change according to the sum value of the NOx concentration and the ammonia concentration in the exhaust gas in the vicinity of the sensor. That is, the lower limit threshold value and the upper limit threshold value are decided based on the concentration of NOx estimated by the controller and the ammonia concentration estimated by the controller. The lower limit threshold value and the upper limit threshold value to be decided in this manner are a lower limit threshold value and an upper limit threshold value before correction thereof, respectively, with no consideration being given to the influence of the decrease in the output value of the sensor due to the reaction of NOx and ammonia.

For this reason, for example, despite the fact that an abnormality has occurred in which the output value of the sensor becomes large, when the output value of the sensor decreases, the actual output value of the sensor can become equal to or larger than the predetermined lower limit threshold value, and at the same time equal to or less than the predetermined upper limit threshold value. In addition, although the sensor is normal, the actual output value of the sensor can become smaller than the lower limit threshold value, due to the decrease in the output of the sensor. In other words, in cases where the output value of the sensor is decreased due to the reaction of NOx and ammonia, even if the abnormality diagnosis of the sensor is carried out with the use of the lower limit threshold value and the upper limit threshold value before correction, there will be a fear that accuracy may become low. In contrast to this, at least one of the lower limit threshold value and the upper limit threshold value is corrected based on the amount of decrease in the output of the sensor. If correction is made in this manner, the correction of the lower limit threshold value or the upper limit threshold value according to the amount of decrease in the output of the sensor will be made possible, as a result of which it is possible to enhance the accuracy of the abnormality diagnosis of the sensor.

Further, said controller can correct at least one of said lower limit threshold value and said upper limit threshold value by subtracting said amount of decrease in the sensor output from the at least one of said lower limit threshold value and said upper limit threshold value.

That is, by decreasing the lower limit threshold value or the upper limit threshold value by the amount of decrease in the output of the sensor, the lower limit threshold value or the upper limit threshold value can be corrected according to the concentrations of NOx and ammonia in the exhaust gas. Here, note that the lower limit threshold value or the upper limit threshold value may be corrected by multiplying the lower limit threshold value or the upper limit threshold value by a correction coefficient based on the amount of decrease in the output of the sensor.

Furthermore, said controller may diagnose that said sensor is normal, in cases where the output value of said sensor is equal to or larger than the predetermined lower limit threshold value, and at the same time is equal to or less than the predetermined upper limit threshold value, which are calculated based on the NOx concentration estimated by said controller and the ammonia concentration estimated by said controller, whereas said controller may diagnose that said sensor is abnormal, in cases where the output value of said sensor is smaller than said predetermined lower limit threshold value, or in cases where the output value of said sensor is larger than said predetermined upper limit threshold value;

wherein said controller can correct the output value of said sensor, based on the amount of decrease in the output of said sensor calculated by said controller.

That is, the output value of the sensor may be corrected, instead of correcting at least one of the lower limit threshold value and the upper limit threshold value. In the case of correcting the output value of the sensor, the output value of the sensor is corrected in such a manner that it becomes larger according to the decrease in the output of the sensor. Here, the actual output value of the sensor can become lower than the actual concentrations of NOx and ammonia flowing out of the NOx catalyst, due to the reaction of NOx and ammonia in the sensor. In contrast to this, if the output value of the sensor is corrected so as to be large based on the amount of decrease in the output of the sensor due to the reaction of NOx and ammonia, the output value of the sensor will become more accurate, as a result of which it will be possible to enhance the accuracy of the abnormality diagnosis of the sensor.

In addition, said controller can correct the output value of said sensor, by adding said amount of decrease in the sensor output to the output value of said sensor. Here, note that the output value of the sensor may be corrected by multiplying the output value of the sensor by a correction coefficient based on the amount of decrease in the output of the sensor.

That is, by increasing the output value of the sensor by the amount of decrease in the output of the sensor, the output value of the sensor can be corrected according to the concentrations of NOx and ammonia in the exhaust gas.

Moreover, said controller may diagnose that said sensor is normal, in cases where the output value of said sensor is equal to or larger than a predetermined lower limit threshold value, which is decided based on the NOx concentration estimated by said controller and the ammonia concentration estimated by said controller, whereas said controller may diagnose that said sensor is abnormal, in cases where the output value of said sensor is smaller than said predetermined lower limit threshold value;

wherein said controller may correct said predetermined lower limit threshold value, based on the amount of decrease in the output of said sensor calculated by said controller.

Further, said controller may correct said predetermined lower limit threshold value, by subtracting said amount of decrease in the sensor output from said predetermined lower limit threshold value.

Furthermore, said controller may diagnose that said sensor is normal, in cases where the output value of said sensor is equal to or less than a predetermined upper limit threshold value, which is decided based on the NOx concentration estimated by said controller and the ammonia concentration estimated by said controller, whereas said controller may diagnose that said sensor is abnormal, in cases where the output value of said sensor is larger than said predetermined upper limit threshold value;

wherein said controller may correct said predetermined upper limit threshold value, based on the amount of decrease in the output of said sensor calculated by said controller.

Further, said controller may correct said predetermined upper limit threshold value, by subtracting said amount of decrease in the sensor output from said predetermined upper limit threshold value.

Furthermore, said controller may diagnose that said sensor is normal, in cases where the output value of said sensor is equal to or larger than a predetermined lower limit threshold value, which is calculated based on the NOx concentration estimated by said controller and the ammonia concentration estimated by said controller, whereas said controller may diagnose that said sensor is abnormal, in cases where the output value of said sensor is smaller than said predetermined lower limit threshold value;

wherein said controller may correct the output value of said sensor, based on the amount of decrease in the output of said sensor calculated by said controller.

In addition, said controller may diagnose that said sensor is normal, in cases where the output value of said sensor is equal to or less than a predetermined upper limit threshold value, which is calculated based on the NOx concentration estimated by said controller and the ammonia concentration estimated by said controller, whereas said controller may diagnose that said sensor is abnormal, in cases where the output value of said sensor is larger than said predetermined upper limit threshold value;

wherein said controller may correct the output value of said sensor, based on the amount of decrease in the output of said sensor calculated by said controller.

Moreover, said controller may correct the output value of said sensor, by adding said amount of decrease in the sensor output to the output value of said sensor.

Effect of the Invention

According to the present invention, it is possible to suppress an incorrect or wrong diagnosis in the abnormality diagnosis of a sensor.

MODES FOR CARRYING OUT THE INVENTION

Hereinafter, modes for carrying out the present invention will be exemplarily described in detail based on embodiments (including modifications) thereof with reference to the attached drawings. However, the dimensions, materials, shapes, relative arrangements and so on of component parts described in the embodiments are not intended to limit the scope of the present invention to these alone in particular as long as there are no specific statements.

First Embodiment

Figure 1:
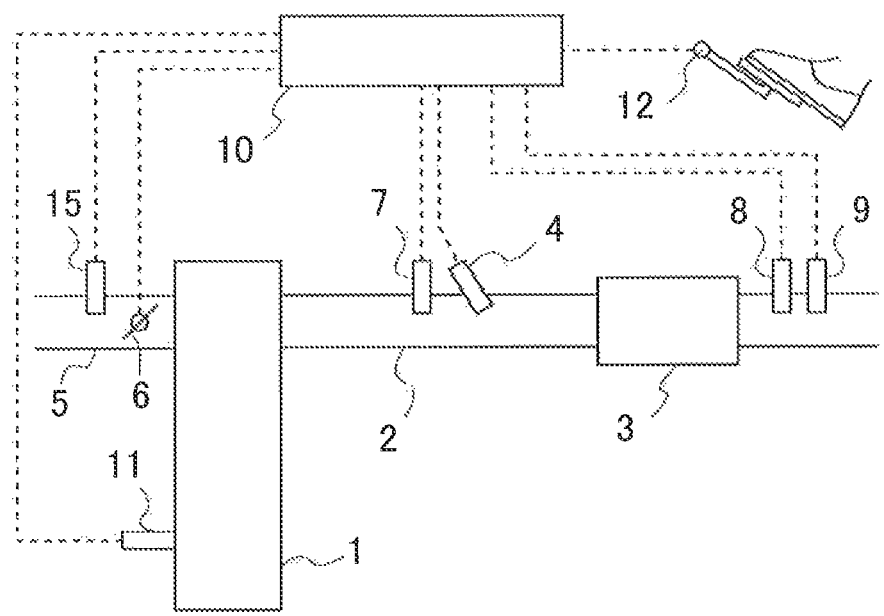
FIG. 1 is a view showing the schematic construction of an internal combustion engine as well as its intake and exhaust systems according to embodiments of the present invention.

FIG. 1 is a view showing the schematic construction of an internal combustion engine as well as its intake and exhaust systems according to embodiments of the present invention. The internal combustion engine 1 is a diesel engine for driving a vehicle. An exhaust passage 2 is connected to the internal combustion engine 1. In the exhaust passage 2, there is arranged an NOx selective reduction catalyst 3 (hereinafter referred to as a NOx catalyst 3) which serves to selectively reduce NOx in an exhaust gas with the use of ammonia as a reducing agent.

In addition, an injection valve 4 for supplying the reducing agent into the exhaust gas is mounted on the exhaust passage 2 at the upstream side of the NOx catalyst 3. For the reducing agent, there is used ammonia ($NH_3$). Here, note that the injection valve 4 may inject ammonia, or may inject urea water, which is a precursor of ammonia. The urea water injected from the injection valve 4 is hydrolyzed into ammonia by the heat of the exhaust gas or heat from the NOx catalyst 3, and the ammonia thus generated is adsorbed to the NOx catalyst 3. This ammonia is used as the reducing agent in the NOx catalyst 3. That is, from the injection valve 4, a substance which changes into ammonia, or ammonia itself, need only be supplied. This substance or ammonia may be supplied in any state of gas, liquid and solid.

Moreover, at the upstream side of the NOx catalyst 3, there is arranged an upstream side NOx sensor 7 for detecting the NOx in the exhaust gas flowing into the NOx catalyst 3. Also, at the downstream side of the NOx catalyst 3, there are arranged a downstream side NOx sensor 8 for detecting the concentration of NOx in the exhaust gas flowing out of the NOx catalyst 3 and a temperature sensor 9 for detecting the temperature of the exhaust gas. Here, note that in this embodiment, the downstream side NOx sensor 8 corresponds to a sensor in the present invention. Further, another NOx selective reduction catalyst can also be arranged at the downstream side of the downstream side NOx sensor 8.

In addition, an intake passage 5 is connected to the internal combustion engine 1. A throttle valve 6 for regulating an amount of intake air to be supplied to the internal combustion engine 1 is arranged in the middle of the intake passage 5. Also, an air flow meter 15 for detecting the amount of intake air to be supplied to the internal combustion engine 1 is mounted on the intake passage 5 at a location upstream of the throttle valve 6.

An ECU 10, which is an electronic control unit, is provided in combination with the internal combustion engine 1. The ECU 10 controls an operating state of the internal combustion engine 1, an exhaust gas purification device, and so on. A crank position sensor 11 and an accelerator opening sensor 12, in addition to the above-mentioned upstream side NOx sensor 7, the downstream side NOx sensor 8, the temperature sensor 9 and the air flow meter 15, are electrically connected to the ECU 10, and the output values of these individual sensors are passed or transmitted to the ECU 10.

Accordingly, the ECU 10 can grasp the operating state of the internal combustion engine 1, such as the number of engine revolutions per unit time based on the detection of the crank position sensor 11, the engine load based on the detection of the accelerator opening sensor 12, etc. Here, note that in this embodiment, the NOx in the exhaust gas flowing into the NOx catalyst 3 is able to be detected by the upstream side NOx sensor 7, but the NOx contained in the exhaust gas discharged from the internal combustion engine 1 (the exhaust gas before being reduced in the NOx catalyst 3, i.e., the exhaust gas flowing into the NOx catalyst 3) has relation with the operating state of the internal combustion engine, and hence, is also able to be estimated based on the above-mentioned operating state of the internal combustion engine 1. In addition, the ECU 10 can estimate the temperature of the NOx catalyst 3 based on the temperature of the exhaust gas detected by the temperature sensor 9 or by a temperature sensor which is arranged at the upstream side of the NOx catalyst 3. Moreover, it is also possible to estimate the temperature of the NOx catalyst 3 based on the operating state of the internal combustion engine 1.

Then, according to the concentration of NOx (this may also be the amount of NOx) in the exhaust gas which is detected or estimated, the ECU 10 gives an instruction to the injection valve 4, so that the reducing agent in an amount necessary for the reduction of NOx is supplied into the exhaust gas.

Accordingly, the controller carries out an abnormality diagnosis of the downstream side NOx sensor 8 based on the output value of the downstream side NOx sensor 8. In cases where the output value of the downstream side NOx sensor 8 is shifted from an output value thereof to be estimated to a large extent, the ECU 10 diagnoses that the downstream side NOx sensor 8 is abnormal. The ECU 10 estimates the output value of the downstream side NOx sensor 8 by estimating the concentrations of NOx and ammonia in the exhaust gas flowing out of the NOx catalyst 3. The output value of the downstream side NOx sensor 8 thus estimated is hereinafter referred to as an "estimated output value".

Here, the downstream side NOx sensor 8 is subjected to interference of ammonia. Ammonia reacts with oxygen ($O_2$) to generate NO in the downstream side NOx sensor 8, so it is detected as NOx. For this reason, when ammonia molecules are contained in the exhaust gas flowing into a detection part of the downstream side NOx sensor 8, they will be detected as NOx. Accordingly, when ammonia flows out of the NOx catalyst 3, the output value of the downstream side NOx sensor 8 becomes large. For example, when the temperature of the NOx catalyst 3 goes up, ammonia desorbs from the NOx catalyst 3, so that the output value of the downstream side NOx sensor 8 can become large. Accordingly, the higher the concentrations of NOx and ammonia in the exhaust gas flowing out of the NOx catalyst 3, the larger becomes the estimated output value of the downstream side NOx sensor 8.

The ECU 10 carries out the abnormality diagnosis of the downstream side NOx sensor 8 based on the estimated output value and the actual output value of the downstream side NOx sensor 8. For example, in cases where the actual output value is within a predetermined range which contains the estimated output value, it can be diagnosed that the downstream side NOx sensor 8 is normal, whereas in cases where the actual output value is out of the predetermined range, it can be diagnosed that the downstream side NOx sensor 8 is abnormal. The predetermined range is a range of the output value of the downstream side NOx sensor 8 in which the downstream side NOx sensor 8 is said to be normal. A lower limit value and an upper limit value of this predetermined range are used as the lower limit threshold value and the upper limit threshold value, respectively. These lower limit threshold value and upper limit threshold value are set based on the estimated output value of the downstream side NOx sensor 8. For example, a value, which is obtained by subtracting a predetermined value from the estimated output value of the downstream side NOx sensor 8, may be used as the lower limit threshold value, and a value, which is obtained by adding a predetermined value to the estimated output value of the downstream side NOx sensor 8, may be used as the upper limit threshold value.

Then, in cases where the actual output value of the downstream side NOx sensor 8 is equal to or larger than the lower limit threshold value, and at the same time, is equal to or less than the upper limit threshold value, it is diagnosed that the downstream side NOx sensor 8 is normal, whereas in cases where the actual output value of the downstream side NOx sensor 8 is smaller than the lower limit threshold value or larger than the upper limit threshold value, it is diagnosed that the downstream side NOx sensor 8 is abnormal. Here, the term "the downstream side NOx sensor 8 is abnormal" means a case where the output value of the downstream side NOx sensor 8 has become in an allowable range. That is, the lower limit threshold value is the lower limit value in the range of the output value in which it can be said that the downstream side NOx sensor 8 is normal. Also, the upper limit threshold value is the upper limit value in the range of the output value in which it can be said that the downstream side NOx sensor 8 is normal. Here, note that prior to the abnormality diagnosis of the downstream side NOx sensor 8, it may be confirmed or checked by a well-known technology that other equipment such as the NOx catalyst 3, the injection valve 4, etc., is normal.

In addition, the estimated output value of the downstream side NOx sensor 8 is changed by the concentrations of NOx and ammonia in the exhaust gas, and hence, the lower limit threshold value and the upper limit threshold value also change according to the concentrations of NOx and ammonia in the exhaust gas. The relation among the estimated output value of the downstream side NOx sensor 8, the lower limit threshold value and the upper limit threshold value may have been obtained in advance by experiments, simulations, or the like and stored in the ECU 10. The lower limit threshold value and the upper limit threshold value referred to herein do not take into consideration the influence of the decrease in the output value of the downstream side NOx sensor 8 due to the reaction of NOx and ammonia.

Figure 2:
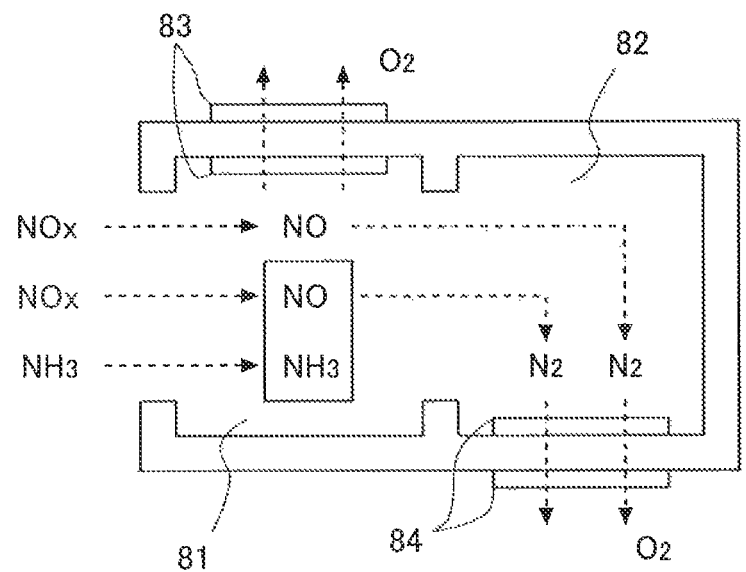
FIG. 2 is a view showing the schematic construction of a detection part of a downstream side NOx sensor according to the embodiments of the present invention.

Here, in the general downstream side NOx sensor 8 in which Pt-based electrodes are used, NOx and ammonia react with each other in the electrodes, so NOx and ammonia decrease. Here, FIG. 2 is a view showing the schematic construction of the detection part of the downstream side NOx sensor 8 according to the embodiments of the present invention. The downstream side NOx sensor 8 is constructed to be provided with a first chamber 81, into which the exhaust gas flows from the exhaust passage 2, and a second chamber 82, which is connected to the first chamber 81. An oxygen pump (electrodes) 83 is arranged in the first chamber 81, and a monitor cell (electrodes) 84 is arranged in the second chamber 82. In the first chamber 81, oxygen in the exhaust gas is removed by the oxygen pump 83. In addition, in the first chamber 81, $NO_2$ in the exhaust gas is reduced to NO. Accordingly, the NO flows into the second chamber 82. Then, in the second chamber 82, the NO is decomposed into $N_2$ and $O_2$, and the amount of the oxygen generated at this time is measured by the monitor cell 84. Moreover, as mentioned above, ammonia reacts with oxygen ($O_2$) to generate NO in the downstream side NOx sensor 8, so it is detected as NOx. For this reason, an electric current flowing into the monitor cell 84 becomes a value corresponding to the concentrations of NOx and ammonia. However, if NOx and ammonia are contained in the exhaust gas, NO and ammonia will react with each other on the oxygen pump 83. Thus, the output value of the downstream side NOx sensor 8 becomes a value corresponding to the amounts of NOx and ammonia after the NOx and the ammonia have decreased on the oxygen pump 83. As a result, when NOx and ammonia exist in the exhaust gas, the output value of the downstream side NOx sensor 8 becomes lower than the sum value of the actual concentrations of NOx and ammonia in the exhaust gas. This phenomenon can occur not only in the sensor of the structure shown in FIG. 2, but also in sensors in which ammonia and NOx can react with each other.

Figure 3:
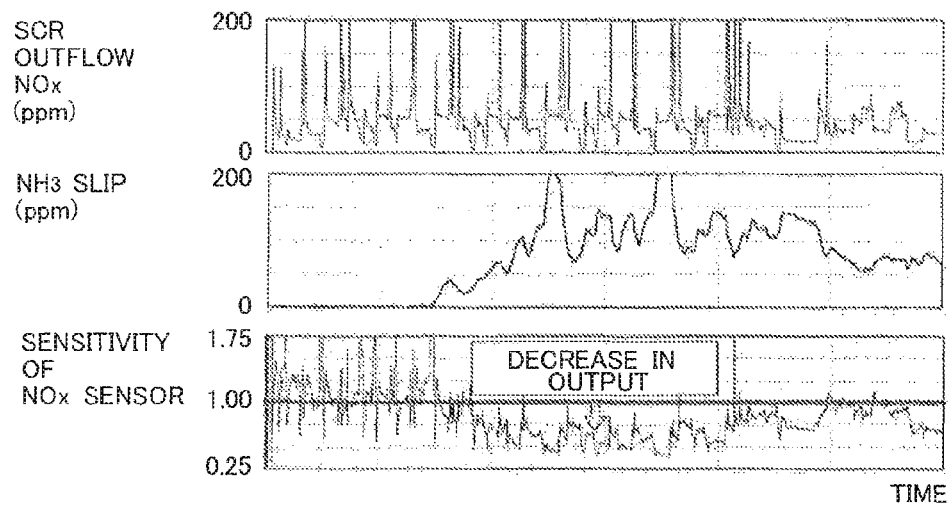
FIG. 3 is a view showing the change over time of the concentration of NOx (SCR outflow NOx) flowing out of the NOx catalyst, the concentration of ammonia ($NH_3$ slip) flowing out of the NOx catalyst, and the sensitivity (NOx sensor sensitivity) of the downstream side NOx sensor.

Here, FIG. 3 is a view showing the change over time of the concentration of NOx (SCR outflow NOx) flowing out of the NOx catalyst 3, the concentration of ammonia ($NH_3$ slip) flowing out of the NOx catalyst 3, and the sensitivity (NOx sensor sensitivity) of the downstream side NOx sensor 8. The axis of abscissa represents time. The sensitivity of the downstream side NOx sensor 8 is a value which is obtained by dividing the output value of the downstream side NOx sensor 8 by the sum value of the actual NOx concentration and the actual ammonia concentration. The concentration of NOx flowing out of the NOx catalyst 3 and the concentration of ammonia flowing out of the NOx catalyst 3 are actual concentrations of NOx and ammonia, respectively.

When the downstream side NOx sensor 8 can detect the concentrations of NOx and ammonia in an accurate manner, the sensitivity of the downstream side NOx sensor 8 is 1. However, in actuality, at the time of the existence of NOx and ammonia, the sensitivity of the downstream side NOx sensor 8 becomes smaller than 1. That is, the output value of the downstream side NOx sensor 8 is decreased by only the amounts of NOx and ammonia which have decreased due to the reaction thereof, so that the sensitivity of the downstream side NOx sensor 8 accordingly decreases.

For this reason, if the abnormality diagnosis of the downstream side NOx sensor 8 is carried out at the time when NOx and ammonia are contained in the exhaust gas, there will be a fear that in spite of the downstream side NOx sensor 8 being normal, the actual output value of the downstream side NOx sensor 8 may become smaller than the lower limit threshold value and hence may be diagnosed as abnormal, due to the decrease of NOx and ammonia in the electrodes of the downstream side NOx sensor 8. Similarly, even in cases where abnormality has occurred in which the output value of the downstream side NOx sensor 8 becomes larger than the actual output value thereof, there will be a fear that due to the decrease in the output of the downstream side NOx sensor 8, the actual output value may become equal to or less than the upper limit threshold value, and so the downstream side NOx sensor 8 may be diagnosed as normal.

Accordingly, in cases where NOx and ammonia are contained in the exhaust gas, the ECU 10 obtains an amount of decrease in the output of the downstream side NOx sensor 8 according to the concentrations of NOx and ammonia. This amount of decrease in the sensor output is an amount of decrease from a sensor output corresponding to the sum value of the concentrations of NOx and ammonia which flow into the downstream side NOx sensor 8. The concentrations of NOx and ammonia flowing into the downstream side NOx sensor 8 can be made equal to the concentrations of NOx and ammonia flowing out of the NOx catalyst 3. This amount of decrease in the sensor output corresponds to a sensor output which is equal to the amounts of NOx and ammonia decreased by the reaction thereof in the downstream side NOx sensor 8. Then, at least one of the upper limit threshold value and the lower limit threshold value at the time of carrying out the abnormality diagnosis of the downstream side NOx sensor 8 is corrected based on this amount of decrease in the sensor output. Here, note that in this embodiment, reference will be made to a case where both the upper limit threshold value and the lower limit threshold value are corrected.

Here, the amount of decrease in the output of the downstream side NOx sensor 8 is associated with the rate of reaction of NOx and ammonia in the downstream side NOx sensor 8. The reaction rate can be represented by the concentrations of the reactants, and a coefficient which is decided by the material of the downstream side NOx sensor 8, etc. Here, note that the NOx reacting with ammonia in the downstream side NOx sensor 8 includes NOx which is originally contained in the exhaust gas, and NOx which is generated by the oxidation of ammonia in the oxygen pump 83 of the downstream side NOx sensor 8.

First, reference will be made to the reaction of NOx, which has been generated by the oxidation of an ammonia, with another ammonia. The amount of the decrease in the output of the downstream side NOx sensor 8 due to the reaction of NOx, which has been generated by the oxidation of an ammonia, with another ammonia is associated with the rate or speed at which an ammonia is oxidized into NOx, and the rate or speed at which this NOx is reduced by another ammonia. Then, the higher the concentration of ammonia, the higher or larger becomes the rate of oxidation of the ammonia. For this reason, the rate of oxidation at the time of the ammonia being oxidized can be represented by the following expression.

$$\text{Rate of oxidation}=k1[NH_3] \qquad \text{(expression 1)}$$

where k1 is a coefficient, which is a value decided by the material of the sensor, etc. In addition, [NH$_3$] indicates the concentration of the ammonia.

In addition, the higher the rate of reduction of NOx, the larger becomes the amount of the decrease in the output of the downstream side NOx sensor 8 becomes large. Then, the higher the concentration of NOx or ammonia, the easier it becomes for NOx to be reduced by ammonia, and hence, the larger the amount of the decrease in the output of the downstream side NOx sensor 8 becomes.

That is, the rate of reduction at the time when the NOx generated by the oxidation of an ammonia reacts with another ammonia can be represented by the following expression.

$$\text{Rate of reduction}=k2(k1[NH_3]\times[NH_3]) \qquad \text{(expression 2)}$$

where k2 is a coefficient, which is a value decided by the material of the sensor, etc.

Next, reference will be made to the reaction of the NOx originally contained in the exhaust gas (i.e., NOx having flowed out of the NOx catalyst 3) with ammonia. In cases where the NOx originally contained in the exhaust gas is reduced by ammonia, the higher the concentration of the NOx, and the higher the concentration of ammonia, the higher becomes the reaction rate, and hence, the larger becomes the amount of the decrease in the output of the downstream side NOx sensor 8. For this reason, the rate of reduction at the time when the NOx originally contained in the exhaust gas is reduced by ammonia can be represented by the following expression.

$$\text{Rate of reduction}=k3[NOx]\times[NH_3] \qquad \text{(expression 3)}$$

where k3 is a coefficient, which is a value decided by the material of the sensor, etc. In addition, [NOx] indicates the concentration of NOx.

Then, the amount of the decrease in the output of the downstream side NOx sensor 8 can be represented by the following expression as a value related to k1, k2, k3, [NOx], and [NH$_3$].

$$\text{Amount of decrease in the sensor output}=F(k1,k2,k3,[NOx],[NH_3]) \qquad \text{(expression 4)}$$

Because k1, k2 and k3 can have been obtained in advance, the amount of decrease in the output of the downstream side NOx sensor 8 can be calculated based on the concentrations of NOx and ammonia in the exhaust gas flowing out of the NOx catalyst 3. This relation can be obtained in advance through experiments, simulations, or the like.

Figure 4:
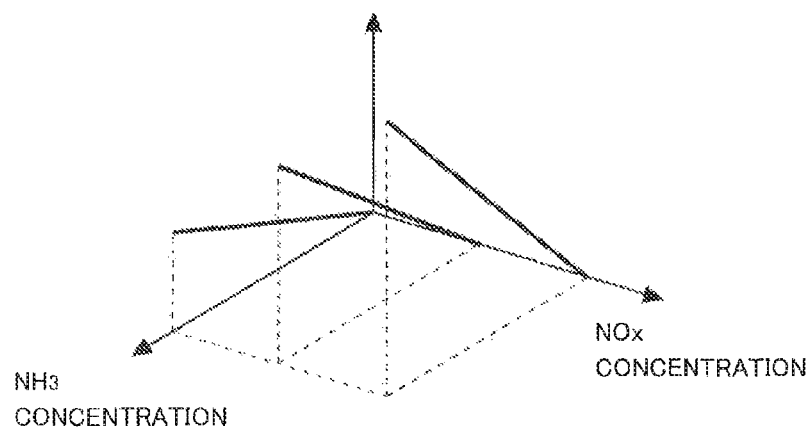
FIG. 4 is a view showing the relation among the concentration of ammonia ($NH_3$), the concentration of NOx, the amount of decrease in the output of the downstream side NOx sensor.

FIG. 4 is a view showing the relation among the concentration of ammonia (NH$_3$), the concentration of NOx, the amount of decrease in the output of the downstream side NOx sensor 8. The higher the concentration of the NOx, and the higher the concentration of ammonia, the larger becomes the amount of the decrease in the output of the downstream side NOx sensor 8. For example, if the relation shown in FIG. 4 has been obtained in advance by experiments or simulations, made into a map and stored in the ECU 10, the amount of decrease in the output of the downstream side NOx sensor 8 can be calculated based on the concentrations of NOx and ammonia in the exhaust gas flowing out of the NOx catalyst 3 during travel of the vehicle.

The concentrations of NOx and ammonia flowing out of the NOx catalyst 3 are estimated by the ECU 10. For example, there is a relation between the operating state of the internal combustion engine 1 and the NOx concentration in the exhaust gas from the internal combustion engine 1, and hence, the NOx concentration in the exhaust gas from the internal combustion engine 1, i.e., the NOx concentration in the exhaust gas flowing into the NOx catalyst 3, can be estimated based on the operating state of the internal combustion engine 1. For example, if the NOx reduction rate of the NOx catalyst 3 has been obtained in advance by experiments, simulations, or the like, the amount of decrease in the concentration of NOx can be calculated based on the NOx reduction rate. Here, note that the NOx reduction rate is also changed by the temperature of the NOx catalyst 3 and the flow speed or rate of the exhaust gas passing through the NOx catalyst 3, so the NOx reduction rate may be set by taking the influence of these factors into consideration. The relation between these factors can have been obtained in advance through experiments, simulations, or the like. In this manner, it is possible to estimate the concentration of NOx in the exhaust gas flowing out of the NOx catalyst 3.

Moreover, the concentration of ammonia in the exhaust gas flowing out of the NOx catalyst 3 is changed by the amount of ammonia injected from the injection valve 4, the temperature of the exhaust gas, and the NOx reduction rate. For example, the more the amount of ammonia injected from the injection valve 4, the higher the temperature of the exhaust gas, and the lower the NOx reduction rate of the NOx catalyst 3, the higher becomes the concentration of ammonia in the exhaust gas flowing out of the NOx catalyst 3. Accordingly, if the relation among these factors has been obtained in advance by experiments, simulations, or the like, the concentration of ammonia in the exhaust gas flowing out of the NOx catalyst 3 can be estimated.

Here, note that k1, k2 and k3 can be respectively obtained by experiments, simulations, or the like. k1, k2 and k3 may also be set as constant values, respectively. In addition, k1, k2 and k3 may also be corrected according to the temperature of the exhaust gas, the temperature of a sensor element of the downstream side NOx sensor 8, the flow speed of the exhaust gas (or the flow rate of the exhaust gas), etc.

Figure 5:
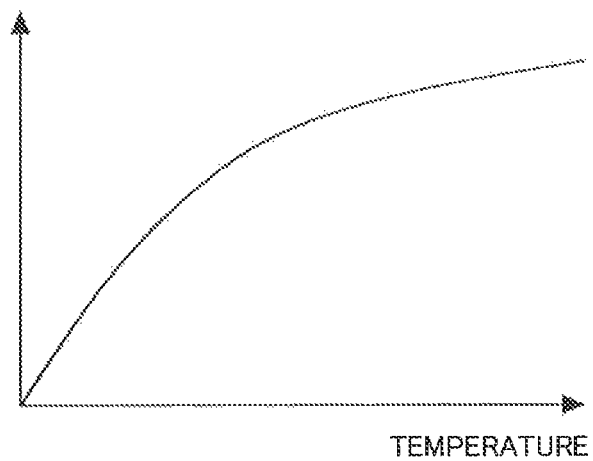
FIG. 5 is a view showing the relation between the temperature and the amount of decrease in the output of the downstream side NOx sensor.

Here, FIG. 5 is a view showing the relation between a temperature and the amount of decrease in the output of the downstream side NOx sensor 8. This temperature can be the temperature of the exhaust gas passing through the downstream side NOx sensor 8, the temperature of the exhaust gas in the vicinity of the downstream side NOx sensor 8, or the temperature of the sensor element of the downstream side NOx sensor 8.

When the temperature is denoted by T, the amount of the decrease in the output of the downstream side NOx sensor 8 generally becomes a value proportional to "$\exp(-E/T)$". That is, the higher the temperature, the more active the reaction of NOx and ammonia becomes, and hence, the larger the amount of the decrease in the output of the downstream side NOx sensor 8 becomes. However, the higher the temperature, the smaller becomes the extent of the rise of the amount of the decrease in the output of the downstream side NOx sensor 8 with respect to the rise of the temperature.

Accordingly, by correcting k1 k2 and k3 or correcting the amount of the decrease in the output of the downstream side NOx sensor 8, in such a manner that the amount of the decrease in the output of the downstream side NOx sensor 8 is proportional to "$\exp(-E/T)$", it becomes possible to perform the correction according to the temperature.

For example, by obtaining a coefficient for correcting the amount of the decrease in the output of the downstream side NOx sensor 8 with respect to the temperature through experiments, simulations or the like in advance and making it into a map, it is possible to obtain from the temperature the coefficient for correcting the amount of the decrease in the output of the downstream side NOx sensor 8. Then, by multiplying the amount of the decrease in the output of the downstream side NOx sensor 8 by the coefficient thus obtained, it becomes possible to perform the correction according to the temperature. In addition, the relation between the temperature and k1, k2 and k3 may have been obtained and made into a map in advance by experiments, simulations or the like.

Figure 6:
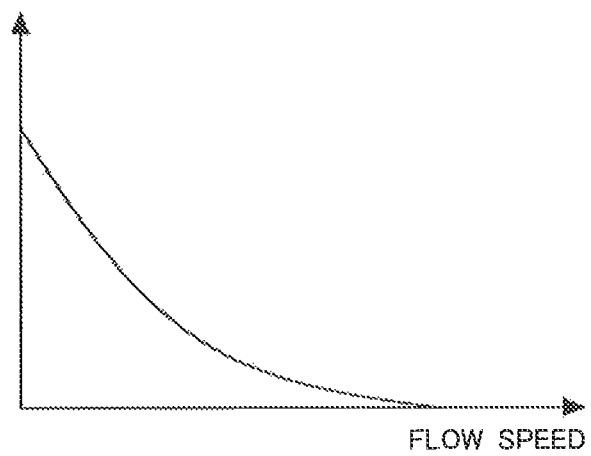
FIG. 6 is a view showing the relation between the flow speed (or rate) of the exhaust gas and the amount of decrease in the output of the downstream side NOx sensor.

In addition, FIG. 6 is a view showing the relation between the flow speed (or rate) of the exhaust gas and the amount of decrease in the output of the downstream side NOx sensor 8. The flow speed of exhaust gas is the flow speed of the exhaust gas in the sensor element of the downstream side NOx sensor 8. However, in cases where the flow speed of the exhaust gas in the sensor element of the downstream side NOx sensor 8 is in a correlation with the flow speed of the exhaust gas in the vicinity of the downstream side NOx sensor 8, the flow speed of the exhaust gas in FIG. 6 may also be the flow speed of the exhaust gas in the vicinity of the downstream side NOx sensor 8.

Here, a period of time for the exhaust gas to be in contact with the sensor element changes according to the flow speed of the exhaust gas, so a period of time in which NOx and ammonia are able to react with each other also changes. Then, the shorter the period of time for the reaction of NOx and ammonia, the smaller become the amounts of decrease of NOx and ammonia. That is, the faster the flow speed of the exhaust gas, the shorter becomes the reaction time of NOx and ammonia, and hence, the smaller becomes the amount of the decrease in the output of the downstream side NOx sensor 8.

Accordingly, by correcting k1 k2 and k3 or correcting the amount of the decrease in the output of the downstream side NOx sensor 8, in such a manner that the relation shown in FIG. 6 can be attained, it becomes possible to perform the correction according to the flow speed of the exhaust gas.

For example, by obtaining a coefficient for correcting the amount of the decrease in the output of the downstream side NOx sensor 8 with respect to the flow speed of the exhaust gas through experiments, simulations or the like in advance and making it into a map, it is possible to obtain from the flow speed of the exhaust gas the coefficient for correcting the amount of the decrease in the output of the downstream side NOx sensor 8. Then, by multiplying the amount of the decrease in the output of the downstream side NOx sensor 8 by the coefficient thus obtained, it becomes possible to perform the correction according to the flow rate of the exhaust gas. In addition, the relation between the flow speed of the exhaust gas and k1, k2 and k3 may have been obtained and made into a map in advance by experiments, simulations or the like. Moreover, the flow speed of the exhaust gas can be obtained based on the amount of intake air detected by the air flow meter 15.

In this manner, the amount of the decrease in the output of the downstream side NOx sensor 8 can be obtained. Then, the ECU 10 corrects the lower limit threshold value and the upper limit threshold value at the time of carrying out the abnormality diagnosis of the downstream side NOx sensor 8 based on the amount of the decrease in the output of the downstream side NOx sensor 8.

Figure 7:
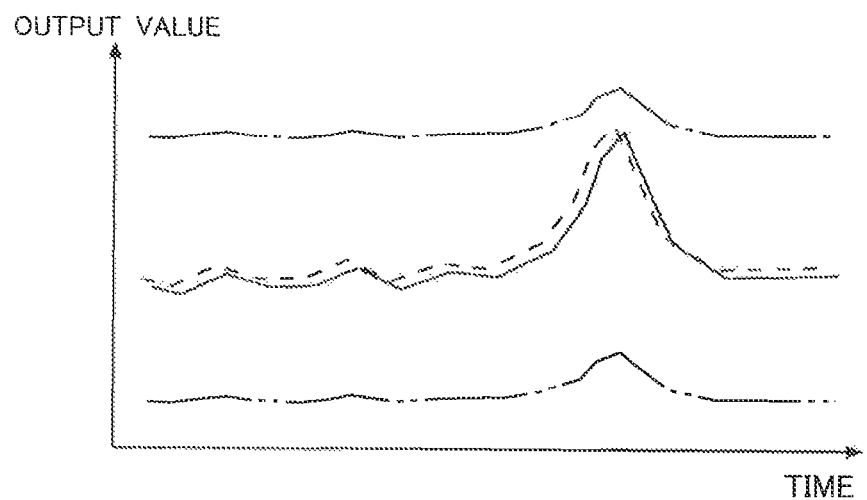
FIG. 7 is a time chart showing the change over time of the output value of the downstream side NOx sensor.

Here, FIG. 7 is a time chart showing the change over time of the output value of the downstream side NOx sensor 8. A solid line indicates an estimated output value of the downstream side NOx sensor 8; a broken line indicates an actual output value at the time of normal operation of the downstream side NOx sensor 8; an alternate long and short dash line indicates an actual output value in cases where abnormality has occurred in which the output value of the downstream side NOx sensor 8 becomes larger than the actual out value; and an alternate long and two short dashes line indicates an actual output value in cases where abnormality has occurred in which the output value of the downstream side NOx sensor 8 becomes smaller than the actual out value.

Even if the downstream side NOx sensor 8 is normal, the output value of the downstream side NOx sensor 8 decreases due to the reaction of NOx and ammonia, as shown in FIG. 7, so the actual output value becomes smaller than the estimated output value. On the other hand, in cases where the downstream side NOx sensor 8 is abnormal, the actual output value thereof shifts or deviates from the estimated output value to a large extent. For this reason, when a shift or deviation from the estimated output value becomes relatively large, it will be diagnosed that the downstream side NOx sensor 8 is abnormal.

Figure 8:
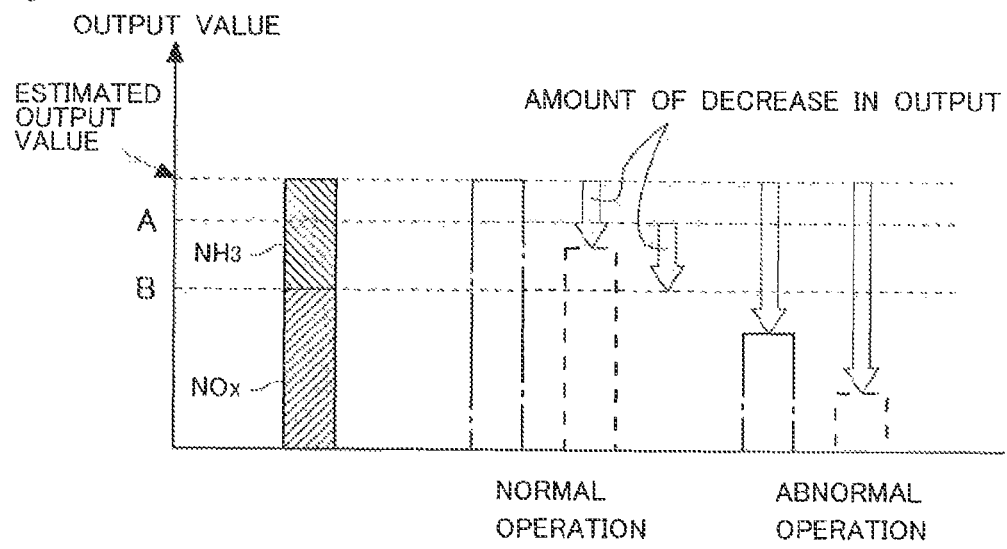
FIG. 8 is a view showing output values of the downstream side NOx sensor at the time of normal operation and at the time of abnormal operation thereof, respectively.

FIG. 8 is a view showing output values of the downstream side NOx sensor 8 at the time of normal operation and at the time of abnormal operation thereof, respectively. The abnormal operation in FIG. 8 shows a case where abnormality has occurred in which the output value of the downstream side NOx sensor 8 becomes smaller than the estimated output value thereof. A solid line indicates the estimated output value of the downstream side NOx sensor 8. That is, the solid line indicates the actual concentrations of NOx and ammonia in the vicinity of the downstream side NOx sensor 8. Here, note that the solid line may instead indicate the concentrations of NOx and ammonia in the exhaust gas flowing out of the NOx catalyst 3. In addition, each broken line shows the output value of the downstream side NOx sensor 8 in cases where NOx and ammonia react with each other in the downstream side NOx sensor 8, and indicates the actual output value of the downstream side NOx sensor 8. Moreover, each alternate long and short dash line indicates the output value of the downstream side NOx sensor 8 in the case of assuming that there has been no decrease in the output of the downstream side NOx sensor 8 due to the reaction of NOx and ammonia in the downstream side NOx sensor 8. If the downstream side NOx sensor 8 is normal, the output value thereof in the case of assuming that there has been no decrease in the output due to the reaction of NOx and ammonia in the downstream side NOx sensor 8 is equal to the estimated output value of the downstream side NOx sensor 8.

"$NH_3$" in FIG. 8 is an amount of increase in the sensor output due to ammonia, and represents the concentration of ammonia in the exhaust gas. Also, "NOx" in FIG. 8 is an amount of increase in the sensor output due to NOx, and represents the concentration of NOx in the exhaust gas.

In FIG. 8, the output value is smaller than the estimated output value either at the time of normal operation of the downstream side NOx sensor 8 and at the time of abnormal operation thereof. In addition, the actual output value of the downstream side NOx sensor 8 is smaller than the output value thereof in the case of assuming that there has been no decrease in the sensor output due to the reaction of NOx and ammonia. That is, at the time of normal operation of the downstream side NOx sensor 8, there has occurred a decrease in the output value thereof due to the reaction of NOx and ammonia. On the other hand, at the time of abnormal operation of the downstream side NOx sensor 8, there have occurred a decrease in the output value due to the abnormal operation and a decrease in the output value due to the reaction of NOx and ammonia. Then, a difference between the estimated output value of the downstream side NOx sensor 8 and the actual output value thereof is larger at the time of abnormal operation of the downstream side NOx sensor 8 than at the time of abnormal operation thereof.

In FIG. 8, reference character A indicates a lower limit threshold value before correction, and reference character B indicates a lower limit threshold value after correction. Here, note that the lower limit threshold value A before correction is a value smaller than the estimated output value of the downstream side NOx sensor 8. The lower limit threshold value B after correction corresponds to a value which is obtained by subtracting the amount of the decrease in the output of the downstream side NOx sensor 8 from the lower limit threshold value A before correction. That is, in this case, the lower limit threshold value is made to shift by the amount of the decrease in the output of the downstream side NOx sensor 8. When the actual output value of the downstream side NOx sensor 8 is equal to or larger than the lower limit threshold value, it is diagnosed that the downstream side NOx sensor 8 is normal, whereas when the actual output value of the downstream side NOx sensor 8 is smaller than the lower limit threshold value, it is diagnosed that the downstream side NOx sensor 8 is abnormal.

The estimated output value of the downstream side NOx sensor 8 and the output value thereof in the case of assuming that there has been no decrease in the output due to the reaction of NOx and ammonia at the time of normal operation of the downstream side NOx sensor 8 are both larger than the lower limit threshold value A before correction. However, the actual output value at the time of normal operation of the downstream side NOx sensor 8 will become smaller than the lower limit threshold value A before correction. When the abnormality diagnosis of the downstream side NOx sensor 8 is carried out in such a state, it will be diagnosed that the downstream side NOx sensor 8 is abnormal, though it is actually normal.

On the other hand, with the lower limit threshold value B after correction, if the downstream side NOx sensor 8 is normal, the actual output value thereof will become larger than the lower limit threshold value B after correction. Accordingly, it is possible to suppress the downstream side NOx sensor 8 from being diagnosed to be abnormal, though it is actually normal. In addition, even when the downstream side NOx sensor 8 is abnormal, the actual output value thereof is decreased due to the reaction of NOx and ammonia, so that the actual output value at the time of abnormal operation of the downstream side NOx sensor 8 will not become larger than the lower limit threshold value B after correction.

In this manner, the amount of the decrease in the output of the downstream side NOx sensor 8 can be used as an amount of correction of the lower limit threshold value. Then, by lowering the lower limit threshold value based on the amount of the decrease in the output of the downstream side NOx sensor 8, it is possible to enhance the accuracy in the abnormality diagnosis of the downstream side NOx sensor 8. Here, note that the lower limit threshold value B after correction need only be calculated based on the lower limit threshold value A before correction and the amount of decrease in the sensor output, and hence, it is not limited to the value which is obtained by subtracting the amount of decrease in the sensor output from the lower limit threshold value A before correction. For example, as the lower limit threshold value B after correction, there may also be used a value which is obtained by multiplying the amount of decrease in the sensor output by a predetermined coefficient, and thereafter subtracting it from the lower limit threshold value A before correction.

Here, note that the lower limit threshold value A before correction is associated with the operating state (i.e., the number of engine revolutions per unit time and the engine load) of the internal combustion engine 1, and hence, the relation between the operating state of the internal combustion engine 1 and the lower limit threshold value A before correction can be obtained in advance by experiments, simulations, or the like. In addition, the concentrations of NOx and ammonia in the exhaust gas flowing out of the NOx catalyst 3 are also changed by the temperature of the NOx catalyst 3 and the flow speed of the exhaust gas passing through the NOx catalyst 3, so the lower limit threshold value A before correction may be set by taking the influence of these factors into consideration.

Figure 9:
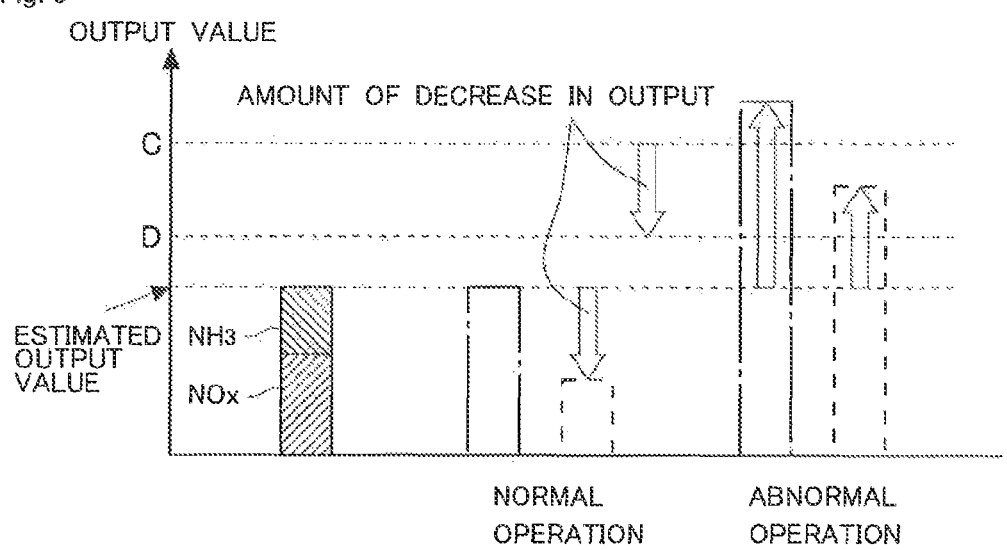
FIG. 9 is a view showing output values of the downstream side NOx sensor at the time of normal operation and at the time of abnormal operation thereof, respectively.

In addition, FIG. 9 is a view showing output values of the downstream side NOx sensor 8 at the time of normal operation and at the time of abnormal operation thereof, respectively. The abnormal operation in FIG. 9 shows a case where abnormality has occurred in which the output value of the downstream side NOx sensor 8 becomes larger than the estimated output value thereof. A solid line indicates the estimated output value of the downstream side NOx sensor 8. That is, the solid line indicates the actual concentrations of NOx and ammonia in the vicinity of the downstream side NOx sensor 8. Here, note that the solid line, broken lines and alternate long and short dash lines are used in the same meaning as in FIG. 8.

"$NH_3$" in FIG. 9 is an amount of increase in the sensor output due to ammonia, and represents the concentration of ammonia in the exhaust gas. Also, "NOx" in FIG. 9 is an amount of increase in the sensor output due to NOx, and represents the concentration of NOx in the exhaust gas.

In FIG. 9, the output value is smaller than the estimated output value either at the time of normal operation of the downstream side NOx sensor 8. On the other hand, the output value is larger than the estimated output value at the time of abnormal operation of the downstream side NOx sensor 8. In addition, the actual output value of the downstream side NOx sensor 8 is smaller than the output value thereof in the case of assuming that there has been no decrease in the sensor output due to the reaction of NOx and ammonia. That is, at the time of normal operation of the downstream side NOx sensor 8, there has occurred a decrease in the output value thereof due to the reaction of NOx and ammonia. On the other hand, at the time of abnormal operation of the downstream side NOx sensor 8, there have occurred an increase in the output value due to the abnormal operation and a decrease in the output value due to the reaction of NOx and ammonia.

In FIG. 9, reference character C indicates an upper limit threshold value before correction, and reference character D indicates an upper limit threshold value after correction. Here, note that the upper limit threshold value C before correction is a value larger than the estimated output value of the downstream side NOx sensor 8. Then, the upper limit threshold value D after correction corresponds to a value which is obtained by subtracting the amount of the decrease in the output of the downstream side NOx sensor 8 from the upper limit threshold value C before correction. That is, in this case, the upper limit threshold value is made to shift by the amount of the decrease in the output of the downstream side NOx sensor 8. When the actual output value of the downstream side NOx sensor 8 is equal to or less than the upper limit threshold value, it is diagnosed that the downstream side NOx sensor 8 is normal, whereas when the actual output value of the downstream side NOx sensor 8 is larger than the upper limit threshold value, it is diagnosed that the downstream side NOx sensor 8 is abnormal.

The estimated output value of the downstream side NOx sensor 8 and the actual output value thereof at the time of normal operation of the downstream side NOx sensor 8 are both smaller than the upper limit threshold value C before correction. Accordingly, it is possible to correctly diagnose that the downstream side NOx sensor 8 is normal. On the other hand, when the downstream side NOx sensor 8 is abnormal, the output value thereof in the case of assuming that there has been no decrease in the output due to the reaction of NOx and ammonia in the downstream side NOx sensor 8 is larger than the upper limit threshold value C before correction. However, the actual output value of the downstream side NOx sensor 8 at the time of abnormal operation thereof is decreased due to the reaction of NOx and ammonia, and hence, can become smaller than the upper limit threshold value C before correction. When the abnormality diagnosis of the downstream side NOx sensor 8 is carried out in such a state, it will be diagnosed that the downstream side NOx sensor 8 is normal, though it is actually abnormal.

On the other hand, with the upper limit threshold value D after correction, if the downstream side NOx sensor 8 is abnormal, the actual output value thereof will become larger than the upper limit threshold value D after correction. Accordingly, it is possible to suppress the downstream side NOx sensor 8 from being diagnosed to be normal, though it is actually abnormal.

In this manner, the amount of the decrease in the output of the downstream side NOx sensor 8 can be used as an amount of correction of the upper limit threshold value. Then, by lowering the upper limit threshold value based on the amount of the decrease in the output of the downstream side NOx sensor 8, it is possible to enhance the accuracy in the abnormality diagnosis of the downstream side NOx sensor 8. Here, note that the upper limit threshold value D after correction need only be calculated based on the upper limit threshold value C before correction and the amount of decrease in the sensor output, and hence, it is not limited to the value which is obtained by subtracting the amount of decrease in the sensor output from the upper limit threshold value C before correction. For example, as the upper limit threshold value D after correction, there may also be used a value which is obtained by multiplying the amount of decrease in the sensor output by a predetermined coefficient, and thereafter subtracting it from the upper limit threshold value C before correction.

Here, note that the upper limit threshold value C before correction is associated with the operating state (i.e., the number of engine revolutions per unit time and the engine load) of the internal combustion engine 1, and hence, the relation between the operating state of the internal combustion engine 1 and the upper limit threshold value C before correction can be obtained in advance by experiments, simulations, or the like. In addition, the concentrations of NOx and ammonia in the exhaust gas flowing out of the NOx catalyst 3 are also changed by the temperature of the NOx catalyst 3 and the flow speed of the exhaust gas passing through the NOx catalyst 3, so the upper limit threshold value C before correction may be set by taking the influence of these factors into consideration.

Figure 10:
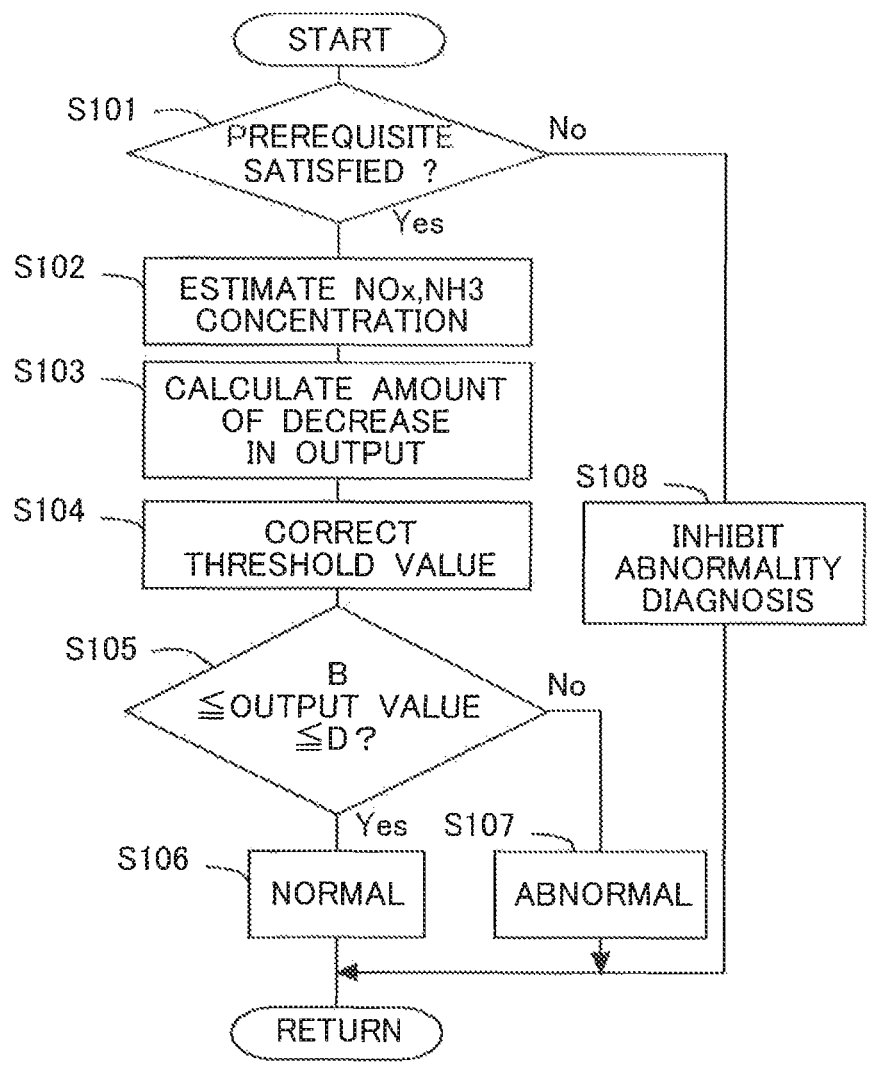
FIG. 10 is a flow chart showing a flow of abnormality diagnosis of the downstream side NOx sensor according to a first embodiment.

FIG. 10 is a flow chart showing a flow or routine of abnormality diagnosis of the downstream side NOx sensor 8 according to a first embodiment. This routine is carried out by means of the ECU 10 at each predetermined time interval.

In step S101, it is determined whether a prerequisite or precondition for performing the abnormality determination of the downstream side NOx sensor 8 is satisfied. In this step, it is determined whether a condition is satisfied in which the abnormality diagnosis of the downstream side NOx sensor 8 can be carried out in an accurate manner. For example, the prerequisite is that if the NOx catalyst 3 is normal, the reduction rate of NOx becomes high and NOx and ammonia are detected in the downstream side NOx sensor 8. More specifically, for example, in cases where all the following conditions hold, a determination is made that the prerequisite for performing the abnormality diagnosis of the downstream side NOx sensor 8 is satisfied. That is, a condition is that the NOx catalyst 3 is in an activated state; another condition is that the downstream side NOx sensor 8 is in an activated state; a further condition is that the warming-up of the internal combustion engine 1 is completed. The temperature of the NOx catalyst 3 can be detected by the temperature sensor 9. Also, whether the downstream side NOx sensor 8 is in an activated state or not can be determined by using well-known techniques. In cases where an affirmative determination is made in step S101, the routine advances to step S102, whereas in cases where a negative determination is made, the routine advances to step S108.

In step S102, the concentrations of NOx and ammonia flowing out of the NOx catalyst 3 are estimated. These concentrations of NOx and ammonia are values which are obtained based on the operating state of the internal combustion engine 1, etc. Here, note that in this embodiment, the ECU 10, which carries out the processing of step S102, corresponds to a controller in the present invention.

In step S103, the amount of the decrease in the output of the downstream side NOx sensor 8 is calculated. This amount of decrease in the sensor output is calculated according to the above-mentioned expression 4 based on the concentrations of NOx and ammonia estimated in step S102. Here, note that the expression 4 as well as k1, k2 and k3 have been obtained in advance by experiments, simulations, or the like, and stored in the ECU 10. Here, note that in this embodiment, the ECU 10, which carries out the processing of step S103, corresponds to a controller in the present invention.

In step S104, the lower limit threshold value and the upper limit threshold value, which are used at the time of the abnormality diagnosis of the downstream side NOx sensor 8, are corrected based on the amount of the decrease in the output of the downstream side NOx sensor 8 calculated in step S103. The lower limit threshold value A before correction and the upper limit threshold value C before correction have been obtained in advance by experiments, simulations, or the like. Then, the lower limit threshold value B after correction can be calculated by subtracting the amount of the decrease in the output of the downstream side NOx sensor 8 from the lower limit threshold value A before correction. In addition, the upper limit threshold value D after correction is calculated by subtracting the amount of the decrease in the output of the downstream side NOx sensor 8 from the upper limit threshold value C before correction.

In step S105, it is determined whether the output value of the downstream side NOx sensor 8 is equal to or larger than the lower limit threshold value B after correction, and at the same time is equal to or less than the upper limit threshold value D after correction. That is, the abnormality diagnosis of the downstream side NOx sensor 8 is carried out. In cases where an affirmative determination is made in step S105, the routine advances to step S106, in which a determination is made that the downstream side NOx sensor 8 is normal. On the other hand, in cases where a negative determination is made in step S105, the routine advances to step S107, in which a determination is made that the downstream side NOx sensor 8 is abnormal. Here, note that in this embodiment, the ECU 10, which carries out the processing of step S104, corresponds to a controller in the present invention, and the ECU 10, which carries out the processing of steps S105, S106 and S107, corresponds to the controller in the present invention.

On the other hand, in step S108, a situation is not suitable for the abnormality diagnosis of the downstream side NOx sensor 8, so the abnormality diagnosis of the downstream side NOx sensor 8 is inhibited. That is, the abnormality diagnosis of the downstream side NOx sensor 8 is not carried out. The condition that abnormality diagnosis is not carried out includes, for example, a case where the ECU 10 reads in the output value of the downstream side NOx sensor 8, but does not carry out abnormality diagnosis with the use of this output value. In addition, the condition of not carrying out abnormality diagnosis also includes, for example, a case where the ECU 10 carries out abnormality diagnosis based on the output value of the downstream side NOx sensor 8, but cancels the result of this diagnosis. Moreover, the condition of not carrying out abnormality diagnosis further includes, for example, a case where the ECU 10 does not read in the output value of the downstream side NOx sensor 8.

Here, note that in the above-mentioned explanation, the lower limit threshold value and the upper limit threshold value are corrected by being lowered by the amount of the decrease in the output of the downstream side NOx sensor 8, but instead of this, the output value of the downstream side NOx sensor 8 may be corrected by being increased by the amount of decrease in the sensor output. Then, in cases where the output value of the downstream side NOx sensor 8 after correction is equal to or larger than the lower limit threshold value A before correction, and at the same time, is equal to or less than the upper limit threshold value C before correction, it may be diagnosed that the downstream side NOx sensor 8 is normal. On the other hand, in cases where the output value of the downstream side NOx sensor 8 after correction is less than the lower limit threshold value A before correction, or is larger than the upper limit threshold value C before correction, it may be diagnosed that the downstream side NOx sensor 8 is abnormal. In such a case, in the above-mentioned step S104, the output value of the downstream side NOx sensor 8 is corrected, instead of correcting the threshold values. In addition, in step S105, there need only be made a comparison of the output value of the downstream side NOx sensor 8 with the lower limit threshold value A before correction and the upper limit threshold value C before correction.

Moreover, the output value of the downstream side NOx sensor 8 may sometimes be corrected by the use of a correction coefficient which is decided according to the temperature thereof or the flow speed of the exhaust gas. In such a case, the correction coefficient for the output value of the downstream side NOx sensor 8 may be corrected, instead of correcting the lower limit threshold value or the upper limit threshold value.

Here, note that the abnormality diagnosis of the downstream side NOx sensor 8 according to this embodiment can be carried out, even in a situation where ammonia flows out of the NOx catalyst 3. Accordingly, abnormality diagnosis can be carried out, even in cases where the reducing agent is supplied to the NOx catalyst 3. In addition, when the temperature of the NOx catalyst 3 goes up, the ammonia adsorbed to the NOx catalyst 3 may desorb from the NOx catalyst 3, and flow out of the NOx catalyst 3. Even in such a case, the abnormality diagnosis of the downstream side NOx sensor 8 can be carried out.

Further, the abnormality diagnosis of the downstream side NOx sensor 8 according to this embodiment can also be used, in cases where ammonia does not exist in the exhaust gas. In this case, it is considered that there is no decrease in the output value of the downstream side NOx sensor 8.

Here, note that in the above description, in cases where the actual output value of the downstream side NOx sensor 8 is equal to or larger than the lower limit threshold value, and at the same time, is equal to or less than the upper limit threshold value, it is diagnosed that the downstream side NOx sensor 8 is normal, whereas in cases where the actual output value of the downstream side NOx sensor 8 is smaller than the lower limit threshold value or larger than the upper limit threshold value, it is diagnosed that the downstream side NOx sensor 8 is abnormal. However, instead of this, in cases where the actual output value of the downstream side NOx sensor 8 is equal to or larger than the lower limit threshold value, it may be diagnosed that the downstream side NOx sensor 8 is normal, whereas in cases where the actual output value of the downstream side NOx sensor 8 is smaller than the lower limit threshold value, it may be diagnosed that the downstream side NOx sensor 8 is abnormal. That is, in this case, it is not necessary to set the upper limit threshold value. On the other hand, even in cases where the actual output value of the downstream side NOx sensor 8 is larger than the upper limit threshold value, it may be diagnosed that the downstream side NOx sensor 8 is normal. In cases where only an abnormality should be diagnosed in which the output value of the downstream side NOx sensor 8 decreases, it is sufficient to make a comparison of the actual output value of the downstream side NOx sensor 8 with the lower limit threshold value. In this case, the lower limit threshold value is corrected by subtracting the amount of decrease in the sensor output from the lower limit threshold value, or the output value of the downstream side NOx sensor 8 is corrected by adding the amount of decrease in the sensor output to the actual output value of the downstream side NOx sensor 8.

Similarly, in cases where the actual output value of the downstream side NOx sensor 8 is equal to or less than the upper limit threshold value, it may be diagnosed that the downstream side NOx sensor 8 is normal, whereas in cases where the actual output value of the downstream side NOx sensor 8 is larger than the upper limit threshold value, it may be diagnosed that the downstream side NOx sensor 8 is abnormal. That is, in this case, it is not necessary to set the lower limit threshold value. On the other hand, even in cases where the actual output value of the downstream side NOx sensor 8 is smaller than the lower limit threshold value, it may be diagnosed that the downstream side NOx sensor 8 is normal. In cases where only an abnormality should be diagnosed in which the output value of the downstream side NOx sensor 8 increases, it is sufficient to make a comparison of the actual output value of the downstream side NOx sensor 8 with the upper limit threshold value. In this case, the upper limit threshold value is corrected by subtracting the amount of decrease in the sensor output from the upper limit threshold value, or the output value of the downstream side NOx sensor 8 is corrected by adding the amount of decrease in the sensor output to the actual output value of the downstream side NOx sensor 8.

Here, note that in this embodiment, the lower limit threshold value and the upper limit threshold value are corrected by subtracting the amount of decrease in the output of the downstream side NOx sensor 8 from the lower limit threshold value and the upper limit threshold value, respectively, but instead of this, the lower limit threshold value and the upper limit threshold value may be corrected by multiplying the lower limit threshold value and the upper limit threshold value by a correction coefficient based on the amount of decrease in the output of the downstream side NOx sensor 8, respectively. In addition, in the case of correcting the output value of the downstream side NOx sensor 8, it may be corrected by multiplying the output value of the downstream side NOx sensor 8 by a correction coefficient.

As described above, in this embodiment, the accuracy in the abnormality diagnosis can be improved by carrying out the abnormality diagnosis of the downstream side NOx sensor 8 in consideration of the fact that the output value of the downstream side NOx sensor 8 is decreased due to the reaction of NOx and ammonia in the downstream side NOx sensor 8.

Second Embodiment

In the first embodiment, by correcting the lower limit threshold value and the upper limit threshold value according to the amount of the decrease in the output of the downstream side NOx sensor 8, the abnormality diagnosis of the downstream side NOx sensor 8 is carried out. On the other hand, in this second embodiment, based on the amount of the decrease in the output of the downstream side NOx sensor 8, it is determined whether the abnormality diagnosis of the downstream side NOx sensor 8 is carried out.

Here, in cases where the abnormality diagnosis of the downstream side NOx sensor 8 is carried out by making a comparison of the output value of the downstream side NOx sensor 8 with the lower limit threshold value and the upper limit threshold value, the larger the amount of the decrease in the output of the downstream side NOx sensor 8, the smaller become the lower limit threshold value and the upper limit threshold value. For example, when the lower limit threshold value becomes too small, the output value of the downstream side NOx sensor 8 can become larger than the lower limit threshold value, even if the downstream side NOx sensor 8 is abnormal. That is, there is a fear that even if the downstream side NOx sensor 8 is abnormal, it may be diagnosed that the downstream side NOx sensor 8 is normal. On the other hand, when the upper limit threshold value becomes too small, the output value of the downstream side NOx sensor 8 can become larger than the upper limit threshold value, even if the downstream side NOx sensor 8 is normal. That is, there is a fear that even if the downstream side NOx sensor 8 is normal, it may be diagnosed that the downstream side NOx sensor 8 is abnormal.

However, in cases where the amount of decrease in the output of the downstream side NOx sensor 8 is small, the output value of the downstream side NOx sensor 8 becomes a value close to a value corresponding to the actual concentration of NOx, and hence, it is not necessary to correct the lower limit threshold value and the upper limit threshold value. On the other hand, when the amount of decrease in the output of the downstream side NOx sensor 8 becomes large, the accuracy of the diagnosis becomes low, as mentioned above. Accordingly, by carrying out the abnormality diagnosis of the downstream side NOx sensor 8 only when the amount of the decrease in the output of the downstream side NOx sensor 8 is equal to or less than a predetermined amount, the reduction in accuracy of the abnormality diagnosis can be suppressed. The predetermined amount is an upper limit value of the amount of the decrease in the output of the downstream side NOx sensor 8 in the case where the accuracy in the abnormality diagnosis of the downstream side NOx sensor 8 becomes within the allowable range. This predetermined amount may be obtained in advance through experiments, simulations, or the like. In addition, in cases where the amount of decrease in the output of the downstream side NOx sensor 8 is larger than the predetermined amount, incorrect or wrong diagnosis can be suppressed by inhibiting the abnormality diagnosis of the downstream side NOx sensor 8.

Figure 11:
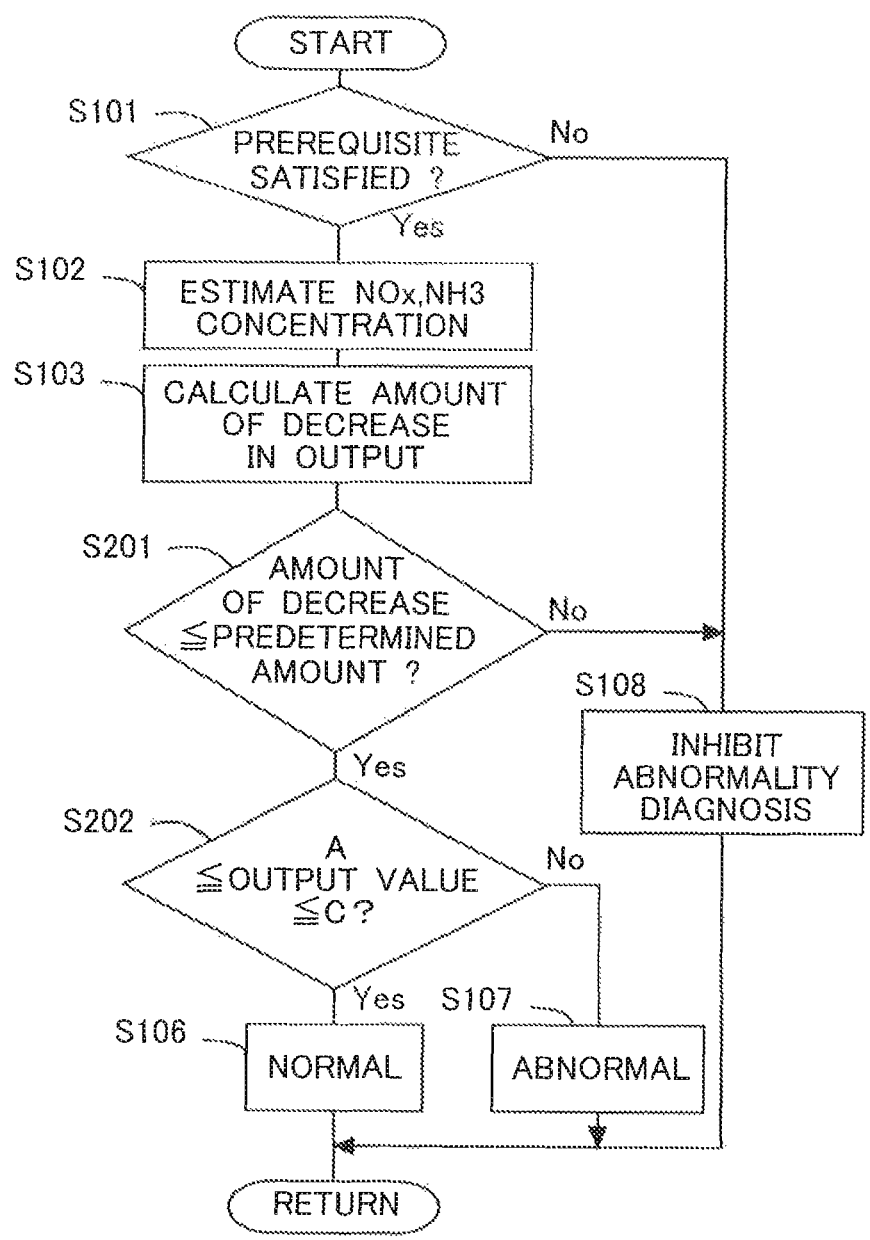
FIG. 11 is a flow chart showing a flow of abnormality diagnosis of the downstream side NOx sensor according to a second embodiment.

FIG. 11 is a flow chart showing a flow or routine of the abnormality diagnosis of the downstream side NOx sensor 8 according to this second embodiment. This routine is carried out by means of the ECU 10 at each predetermined time interval. Here, note that for those steps in which the same processing as in the above-mentioned routine of the first embodiment is carried out, the same symbols are attached and an explanation thereof is omitted. In this routine, step S201 is carried out in place of the step S104 in the above-mentioned routine of the first embodiment.

That is, in this embodiment, step S201 is processed after step S103. In step S201, it is determined whether the amount of the decrease in the output of the downstream side NOx sensor 8 calculated in step S103 is equal to or less than the predetermined amount. The predetermined amount is the upper limit value of the amount of the decrease in the output of the downstream side NOx sensor 8 in the case where the accuracy in the abnormality diagnosis of the downstream side NOx sensor 8 becomes within the allowable range. In cases where an affirmative determination is made in step S201, the routine advances to step S202, whereas in cases where a negative determination is made, the routine advances to step S108.

In step S202, it is determined whether the output value of the downstream side NOx sensor 8 is equal to or more than the lower limit threshold value A before correction, and at the same time is equal to or less than the upper limit threshold value C before correction. That is, the abnormality diagnosis of the NOx catalyst 3 is carried out. In this step, a determination is made based on the lower limit threshold value and the upper limit threshold value which have not been corrected. In cases where an affirmative determination is made in step S202, the routine advances to step S106, in which a diagnosis is made that the NOx catalyst 3 is normal. On the other hand, in cases where a negative determination is made in step S202, the routine advances to step S107, in which a determination is made that the NOx catalyst 3 is abnormal. Here, note that in this embodiment, the ECU 10, which carries out the processing of steps S201 and S108, corresponds to the controller in the present invention, and the ECU 10, which carries out the processing of steps S202, S106 and S107, corresponds to the controller in the present invention.

Figure 12:
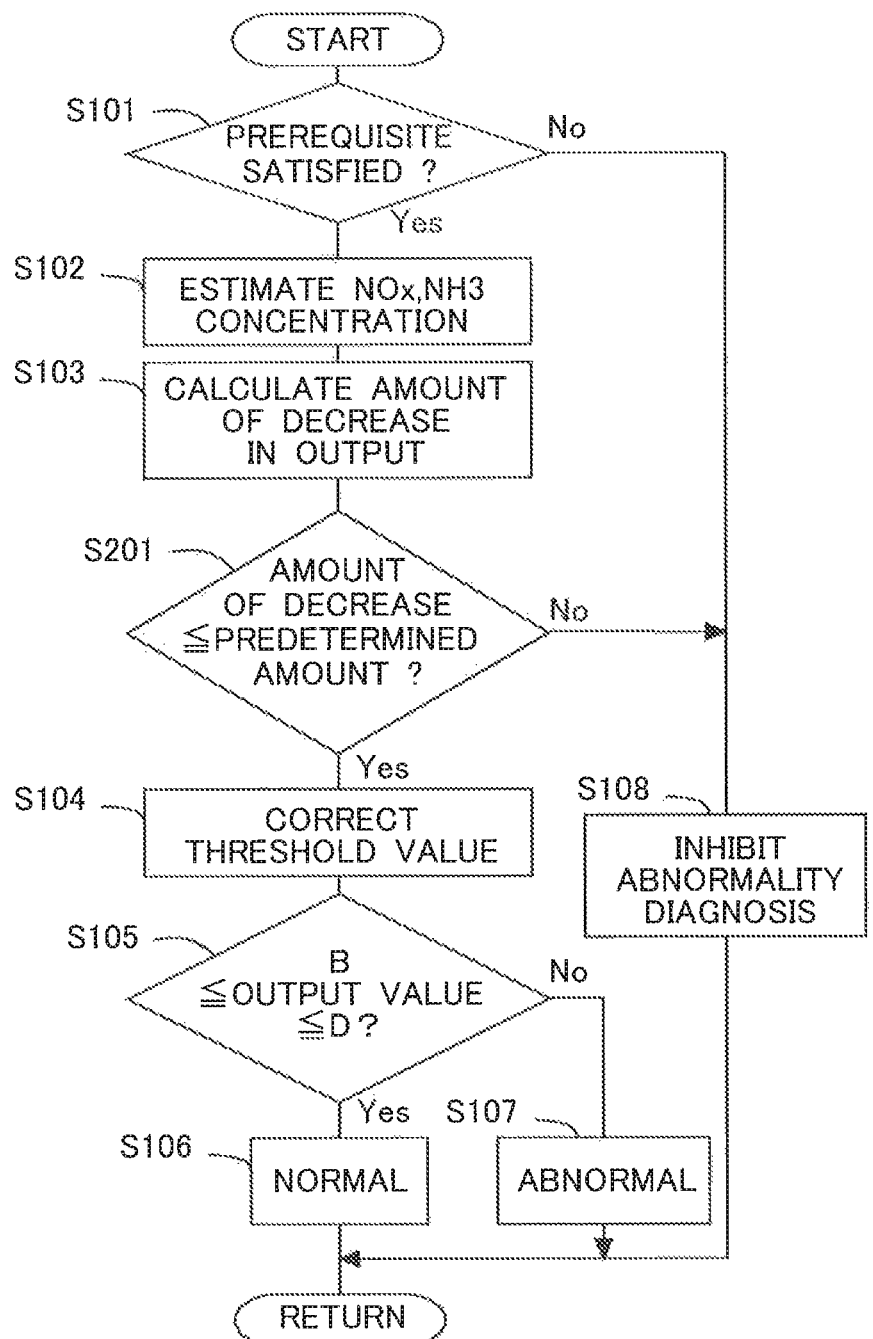
FIG. 12 is another flow chart showing a flow of abnormality diagnosis of the downstream side NOx sensor according to the second embodiment.

Here, note that in this embodiment, the step S104 in the above-mentioned routine of the first embodiment may also be carried out. FIG. 12 is another flow chart showing a flow or routine of the abnormality diagnosis of the downstream side NOx sensor 8 according to this second embodiment. This routine is carried out by means of the ECU 10 at each predetermined time interval. Here, note that for those steps in which the same processing as in the above-mentioned routine of the second embodiment is carried out, the same symbols are attached and an explanation thereof is omitted. In this routine, step S104 is carried out after the processing in step S201 in the above-mentioned routine of the second embodiment. That is, in cases where an affirmative determination is made in step S201, the routine advances to step S104, whereas in cases where a negative determination is made, the routine advances to step S108. In such a case, the ECU 10, which carries out the processing of steps S201, S104 and S108, corresponds to the controller in the present invention, and the ECU 10, which carries out the processing of steps S105, S106 and S107, corresponds to the controller in the present invention.

As described above, according to this embodiment, the accuracy in the abnormality diagnosis can be improved by carrying out the abnormality diagnosis of the downstream side NOx sensor 8 only when the amount of the decrease in the output of the downstream side NOx sensor 8 due to the reaction of NOx and ammonia in the downstream side NOx sensor 8 is small.

Third Embodiment

In the above-mentioned embodiments, the abnormality diagnosis of the downstream side NOx sensor 8 is carried out by making a comparison of the output value of the downstream side NOx sensor 8 with the lower limit threshold value or the upper limit threshold value, but in the following embodiment, the abnormality diagnosis of the downstream side NOx sensor 8 is carried out by comparing the NOx reduction rate in the NOx catalyst 3 with a lower limit threshold value or an upper limit threshold value of the NOx reduction rate.

Here, the NOx reduction rate is a ratio of the concentration of NOx to be decreased by the reduction thereof in the NOx catalyst 3 with respect to the concentration of NOx in the exhaust gas flowing into the NOx catalyst 3. A value, which is obtained by subtracting the concentration of NOx in the exhaust gas flowing out of the NOx catalyst 3 from the concentration of NOx in the exhaust gas flowing into the NOx catalyst 3, is the concentration of NOx to be decreased by the reduction thereof in the NOx catalyst 3. Then, the concentration of NOx in the exhaust gas flowing into the NOx catalyst 3 can be detected based on the upstream side NOx sensor 7, or can be estimated based on the operating state of the internal combustion engine 1. In addition, the concentration of NOx in the exhaust gas flowing out of the NOx catalyst 3 is detected based on the downstream side NOx sensor 8. Accordingly, the NOx reduction rate thus calculated is also affected by the influence of ammonia in the exhaust gas.

The ECU 10 carries out the abnormality diagnosis of the downstream side NOx sensor 8 based on the NOx reduction rate thus estimated (the estimated output value) and an NOx reduction rate calculated based on the actual output value of the downstream side NOx sensor 8. For example, in cases where the NOx reduction rate thus calculated is within a predetermined range including the estimated NOx reduction rate, it can be diagnosed that the downstream side NOx sensor 8 is normal, whereas in cases where the NOx reduction rate thus calculated is out of the predetermined range, it can be diagnosed that the downstream side NOx sensor 8 is abnormal. The predetermined range is a range of the output value of the downstream side NOx sensor 8 in which the downstream side NOx sensor 8 is said to be normal. A lower limit value and an upper limit value of this predetermined range are used as the lower limit threshold value and the upper limit threshold value, respectively. These lower limit threshold value and upper limit threshold value are set based on the estimated NOx reduction. In addition, the lower limit threshold value and the upper limit threshold value can also be obtained in advance through experiments, simulations, or the like. Here, note that the estimated NOx reduction rate may be set based on the estimated output value of the downstream side NOx sensor 8. In addition, it may be confirmed or checked by a well-known technology that the NOx catalyst 3 is normal, and the abnormality diagnosis of the downstream side NOx sensor 8 may be carried out based on the NOx reduction rate at the time when the NOx catalyst 3 is normal. Moreover, the predetermined range of the NOx reduction rate may be decided according to the extent of the deterioration of the NOx catalyst 3. Further, when the NOx catalyst 3 is not deteriorated but is normal, and when the actual NOx reduction rate is in the vicinity of 100%, the abnormality diagnosis of the downstream side NOx sensor 8 may be carried out. In addition, for example, a value, which is obtained by subtracting a predetermined value from the estimated NOx reduction rate, may be used as the lower limit threshold value, and a value, which is obtained by adding a predetermined value to the estimated NOx reduction rate, may be used as the upper limit threshold value.

Then, in cases where the NOx reduction rate thus calculated is equal to or larger than the lower limit threshold value, and at the same time, is equal to or less than the upper limit threshold value, it is diagnosed that the downstream side NOx sensor 8 is normal, whereas in cases where the NOx reduction rate thus calculated is smaller than the lower limit threshold value or larger than the upper limit threshold value, it is diagnosed that the downstream side NOx sensor 8 is abnormal.

For this reason, if the abnormality diagnosis of the downstream side NOx sensor 8 is carried out at the time when NOx and ammonia are contained in the exhaust gas, there will be a fear that in spite of the downstream side NOx sensor 8 being normal, the NOx reduction rate calculated based on the actual output value of the downstream side NOx sensor 8 may become larger than the upper limit threshold value and hence may be diagnosed as abnormal, because the NOx reduction rate apparently rises due to the decrease of the output of the downstream side NOx sensor 8. Similarly, even in cases where abnormality has occurred in which the output value of the downstream side NOx sensor 8 becomes larger than the actual output value thereof, there will be a fear that due to the decrease in the output of the downstream side NOx sensor 8, the NOx reduction rate calculated based on the actual output value may become equal to or larger than the lower limit threshold value, and so the downstream side NOx sensor 8 may be diagnosed as normal.

Accordingly, in cases where NOx and ammonia are contained in the exhaust gas, the ECU 10 obtains the amount of decrease in the output of the downstream side NOx sensor 8 according to the concentrations of NOx and ammonia in the exhaust gas, and corrects at least one of the lower limit threshold value and the upper limit threshold value at the time of carrying out the abnormality diagnosis of the downstream side NOx sensor 8 based on this amount of decrease in the sensor output. Here, note that in this third embodiment, reference will be made to a case where both the upper limit threshold value and the lower limit threshold value are corrected.

The output value of the downstream side NOx sensor 8 is decreased due to the reaction of NOx and ammonia, so the NOx reduction rate calculated based on the output value of the downstream side NOx sensor 8 becomes higher than the actual NOx reduction rate. Accordingly, by correcting the upper limit value and the lower limit value of the predetermined range of the NOx reduction rate so that they are increased by an amount by which the NOx reduction rate has become high under the influence of NOx and ammonia, or by correcting the NOx reduction rate itself so that it is decreased by the same amount as above, the accuracy in the abnormality diagnosis of the downstream side NOx sensor 8 can be improved.

Figure 13:
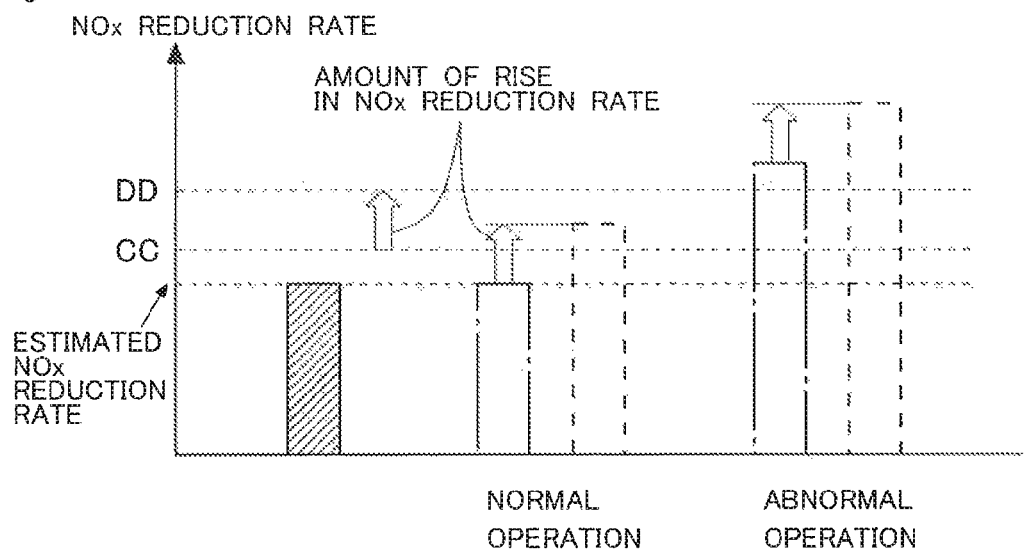
FIG. 13 is a view showing NOx reduction rates calculated based on output values of the downstream side NOx sensor at the time of normal operation and at the time of abnormal operation thereof, respectively.

FIG. 13 is a view showing NOx reduction rates calculated based on output values of the downstream side NOx sensor 8 at the time of normal operation and at the time of abnormal operation thereof, respectively. The abnormal operation in FIG. 13 shows a case where abnormality has occurred in which the output value of the downstream side NOx sensor 8 becomes smaller than the estimated output value thereof, and the NOx reduction rate thus calculated becomes higher than the estimated NOx reduction rate. A solid line shows the estimated NOx reduction rate calculated based on the estimated output value of the downstream side NOx sensor 8. That is, the solid line indicates the actual NOx reduction rate. Here, note that the solid line may instead be an NOx reduction rate calculated based on the concentrations of NOx and ammonia in the exhaust gas flowing out of the NOx catalyst 3. In addition, each broken line shows an NOx reduction rate calculated based on the output value of the downstream side NOx sensor 8 in cases where NOx and ammonia react with each other in the downstream side NOx sensor 8, and indicates an NOx reduction rate calculated based on the actual output value of the downstream side NOx sensor 8. Moreover, each alternate long and short dash line shows an NOx reduction rate calculated based on the output value of the downstream side NOx sensor 8 in the case of assuming that there has been no decrease in the output of the downstream side NOx sensor 8 due to the reaction of NOx and ammonia in the downstream side NOx sensor 8. If the downstream side NOx sensor 8 is normal, the NOx reduction rate in the case of assuming that there has been no decrease in the output due to the reaction of NOx and ammonia in the downstream side NOx sensor 8 is equal to the estimated NOx reduction rate.

In FIG. 13, both at the time of normal operation and at the time of abnormal operation of the downstream side NOx sensor 8, the NOx reduction rate calculated based on the actual output value of the downstream side NOx sensor 8 becomes larger than the estimated NOx reduction rate. In addition, the NOx reduction rate calculated based on the actual output value of the downstream side NOx sensor 8 is larger than the NOx reduction rate in the case of assuming that there has been no decrease in the sensor output due to the reaction of NOx and ammonia. That is, at the time of normal operation of the downstream side NOx sensor 8, there has occurred a decrease in the output value thereof due to the reaction of NOx and ammonia, so that the NOx reduction rate calculated based on the output value of the downstream side NOx sensor 8 goes up. On the other hand, at the time of abnormal operation of the downstream side NOx sensor 8, there have occurred a rise or increase in the NOx reduction rate due to the abnormal operation thereof and a rise or increase in the NOx reduction rate due to the reaction of NOx and ammonia. Then, a difference between the estimated NOx reduction rate and the NOx reduction rate calculated based on the actual output value of the downstream side NOx sensor 8 is larger at the time of abnormal operation of the downstream side NOx sensor 8 than at the time of normal operation thereof.

In FIG. 13, reference character CC indicates an upper limit threshold value before correction, and reference character DD indicates an upper limit threshold value after correction. Here, note that the upper limit threshold value CC before correction is a value larger than the estimated NOx reduction rate. The upper limit threshold value DD after correction corresponds to a value which is obtained by adding an amount of rise or increase in the NOx reduction rate calculated based on the amount of decrease in the output of the downstream side NOx sensor 8 to the upper limit threshold value CC before correction. Here, note that the amount of rise in the NOx reduction rate is a ratio of the amount of decrease in the output of the downstream side NOx sensor 8 with respect to the concentration of NOx in the exhaust gas flowing into the NOx catalyst 3. That is, the upper limit threshold value is made to shift by the amount of rise in the NOx reduction rate calculated based on the amount of decrease in the output of the downstream side NOx sensor 8. When the NOx reduction rate calculated based on the actual output value of the downstream side NOx sensor 8 is equal to or less than the upper limit threshold value, it is diagnosed that the downstream side NOx sensor 8 is normal, whereas when the NOx reduction rate is larger than the upper limit threshold value, it is diagnosed that the downstream side NOx sensor 8 is abnormal.

The estimated NOx reduction rate and the NOx reduction rate calculated based on the output value in the case of assuming that there was no decrease in the output of the downstream side NOx sensor 8 due to the reaction of NOx and ammonia at the time of normal operation of the downstream side NOx sensor 8 are smaller than the upper limit threshold value CC before correction. However, the NOx reduction rate calculated based on the actual output value of the downstream side NOx sensor 8 at the time of normal operation thereof will become larger than the upper limit threshold value CC before correction. When the abnormality diagnosis of the downstream side NOx sensor 8 is carried out in such a state, the downstream side NOx sensor 8 will be diagnosed to be abnormal, though it is actually normal.

On the other hand, with the upper limit threshold value DD after correction, if the downstream side NOx sensor 8 is normal, the NOx reduction rate calculated based on the actual output value thereof will become smaller than the upper limit threshold value DD after correction. Accordingly, it is possible to suppress the downstream side NOx sensor 8 from being diagnosed to be abnormal, though it is actually normal. In addition, even when the downstream side NOx sensor 8 is abnormal, the actual output value thereof is decreased due to the reaction of NOx and ammonia, and hence, the NOx reduction rate thus calculated rises, as a result of which the NOx reduction rate calculated based on the actual output value of the downstream side NOx sensor 8 at the time of abnormal operation thereof will not become smaller than the upper limit threshold value DD after correction.

In this manner, the amount of rise in the NOx reduction rate calculated based on the amount of decrease in the output of the downstream side NOx sensor 8 can be used as an amount of correction of the upper limit threshold value. Then, by raising the upper limit threshold value based on the amount of rise in the NOx reduction rate, it is possible to enhance the accuracy in the abnormality diagnosis of the downstream side NOx sensor 8. Here, note that the upper limit threshold value DD after correction need only be calculated based on the upper limit threshold value CC before correction and the NOx reduction rate calculated based on the amount of decrease in the sensor output, and hence, it is not limited to the value which is obtained by adding the amount of rise in the NOx reduction rate to the upper limit threshold value CC before correction. For example, as the upper limit threshold value DD after correction, there may also be used a value which is obtained by multiplying the amount of rise in the NOx reduction rate by a predetermined coefficient, and thereafter adding it to the upper limit threshold value CC before correction.

Here, note that the upper limit threshold value CC before correction is associated with the operating state (i.e., the number of engine revolutions per unit time and the engine load) of the internal combustion engine 1, and hence, the relation between the operating state of the internal combustion engine 1 and the upper limit threshold value CC before correction can be obtained in advance by experiments, simulations, or the like. In addition, the concentrations of NOx and ammonia in the exhaust gas flowing out of the NOx catalyst 3 are also changed by the temperature of the NOx catalyst 3 and the flow speed of the exhaust gas passing through the NOx catalyst 3, so the upper limit threshold value CC before correction may be set by taking the influence of these factors into consideration.

Figure 14:
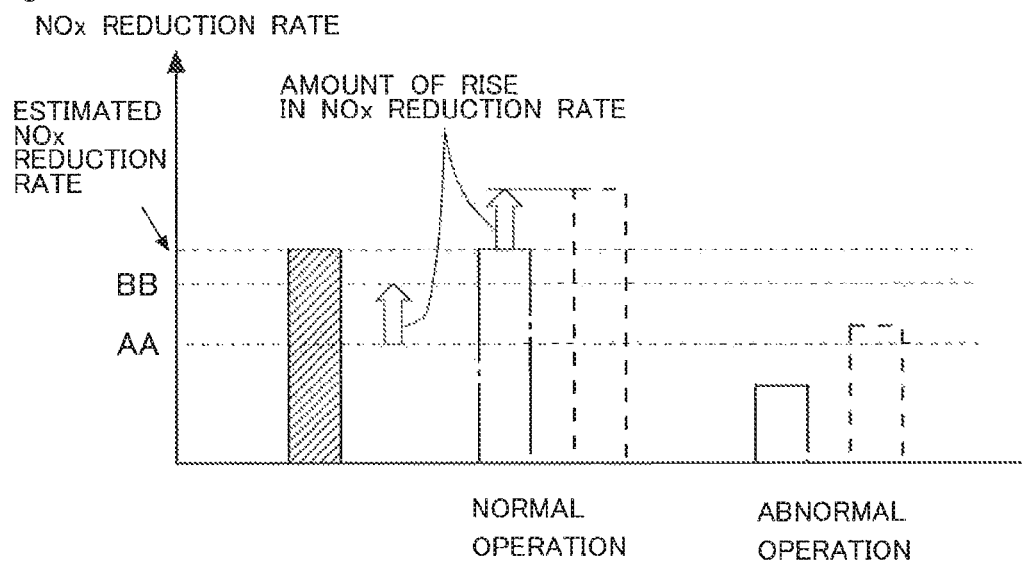
FIG. 14 is a view showing NOx reduction rates calculated based on output values of the downstream side NOx sensor at the time of normal operation and at the time of abnormal operation thereof, respectively.

In addition, FIG. 14 is a view showing NOx reduction rates calculated based on output values of the downstream side NOx sensor 8 at the time of normal operation and at the time of abnormal operation thereof, respectively. The abnormal operation in FIG. 14 shows a case where abnormality has occurred in which the output value of the downstream side NOx sensor 8 becomes larger than the estimated NOx reduction rate, and the NOx reduction rate thus calculated becomes lower than the estimated rate of NOx reduction. Here, note that a solid line, broken lines and alternate long and short dash lines are used in the same meaning as in FIG. 13.

In FIG. 14, at the time of normal operation of the downstream side NOx sensor 8, the NOx reduction rate calculated based on the output value of the downstream side NOx sensor 8 becomes larger than the estimated NOx reduction rate. On the other hand, at the time of abnormal operation of the downstream side NOx sensor 8, the NOx reduction rate calculated based on the output value of the downstream side NOx sensor 8 becomes smaller than the estimated NOx reduction rate. In addition, the NOx reduction rate calculated based on the actual output value of the downstream side NOx sensor 8 is larger than the NOx reduction rate calculated based on the output value thereof in the case of assuming that there has been no decrease in the sensor output due to the reaction of NOx and ammonia. That is, at the time of normal operation of the downstream side NOx sensor 8, there has occurred a decrease in the output value thereof due to the reaction of NOx and ammonia, so that the NOx reduction rate calculated based on the output value of the downstream side NOx sensor 8 goes up. On the other hand, at the time of abnormal operation of the downstream side NOx sensor 8, there have occurred a decrease in the NOx reduction rate due to the abnormal operation thereof and a rise or increase in the NOx reduction rate due to the reaction of NOx and ammonia.

In FIG. 14, reference character AA indicates a lower limit threshold value before correction, and reference character BB indicates a lower limit threshold value after correction. Here, note that the lower limit threshold value AA before correction is a value larger than the estimated NOx reduction rate. Then, the lower limit threshold value BB after correction corresponds to a value which is obtained by adding the amount of rise in the NOx reduction rate calculated based on the amount of decrease in the output of the downstream side NOx sensor 8 to the lower limit threshold value AA before correction. That is, the lower limit threshold value is made to shift by the amount of rise in the NOx reduction rate calculated based on the amount of decrease in the output of the downstream side NOx sensor 8. When the NOx reduction rate calculated based on the actual output value of the downstream side NOx sensor 8 is equal to or larger than the lower limit threshold value, it is diagnosed that the downstream side NOx sensor 8 is normal, whereas when the NOx reduction rate is smaller than the lower limit threshold value, it is diagnosed that the downstream side NOx sensor 8 is abnormal.

The estimated NOx reduction rate and the NOx reduction rate calculated based on the actual output value of the downstream side NOx sensor 8 at the time of normal operation thereof are larger than the lower limit threshold value AA before correction. Accordingly, it is possible to correctly diagnose that the downstream side NOx sensor 8 is normal. On the other hand, when the downstream side NOx sensor 8 is abnormal, the NOx reduction rate calculated based on the output value thereof in the case of assuming that there has been no decrease in the output due to the reaction of NOx and ammonia in the downstream side NOx sensor 8 is smaller than the lower limit threshold value AA before correction. However, the NOx reduction rate calculated based on the actual output value of the downstream side NOx sensor 8 at the time of abnormal operation thereof is raised or increased due to the reaction of NOx and ammonia, and hence, can become larger than the lower limit threshold value AA before correction. When the abnormality diagnosis of the downstream side NOx sensor 8 is carried out in such a state, the downstream side NOx sensor 8 will be diagnosed to be normal, though it is actually abnormal.

On the other hand, with the lower limit threshold value BB after correction, if the downstream side NOx sensor 8 is abnormal, the NOx reduction rate calculated based on the actual output value thereof will become smaller than the lower limit threshold value BB after correction. Accordingly, it is possible to suppress the downstream side NOx sensor 8 from being diagnosed to be normal, though it is actually abnormal.

In this manner, the amount of rise in the NOx reduction rate calculated based on the amount of decrease in the output of the downstream side NOx sensor 8 can be used as an amount of correction of the lower limit threshold value. Then, by raising the lower limit threshold value based on the amount of rise in the NOx reduction rate, it is possible to enhance the accuracy in the abnormality diagnosis of the downstream side NOx sensor 8. Here, note that the lower limit threshold value BB after correction need only be calculated based on the lower limit threshold value AA before correction and the NOx reduction rate calculated based on the amount of decrease in the sensor output, and hence, it is not limited to the value which is obtained by adding the amount of rise in the NOx reduction rate to the lower limit threshold value AA before correction. For example, as the lower limit threshold value BB after correction, there may also be used a value which is obtained by multiplying the amount of rise in the NOx reduction rate by a predetermined coefficient, and thereafter adding it to the lower limit threshold value AA before correction.

Here, note that the lower limit threshold value AA before correction is associated with the operating state (i.e., the number of engine revolutions per unit time and the engine load) of the internal combustion engine 1, and hence, the relation between the operating state of the internal combustion engine 1 and the lower limit threshold value AA before correction can be obtained in advance by experiments, simulations, or the like. In addition, the concentrations of NOx and ammonia in the exhaust gas flowing out of the NOx catalyst 3 are also changed by the temperature of the NOx catalyst 3 and the flow speed of the exhaust gas passing through the NOx catalyst 3, so the lower limit threshold value AA before correction may be set by taking the influence of these factors into consideration.

Figure 15:
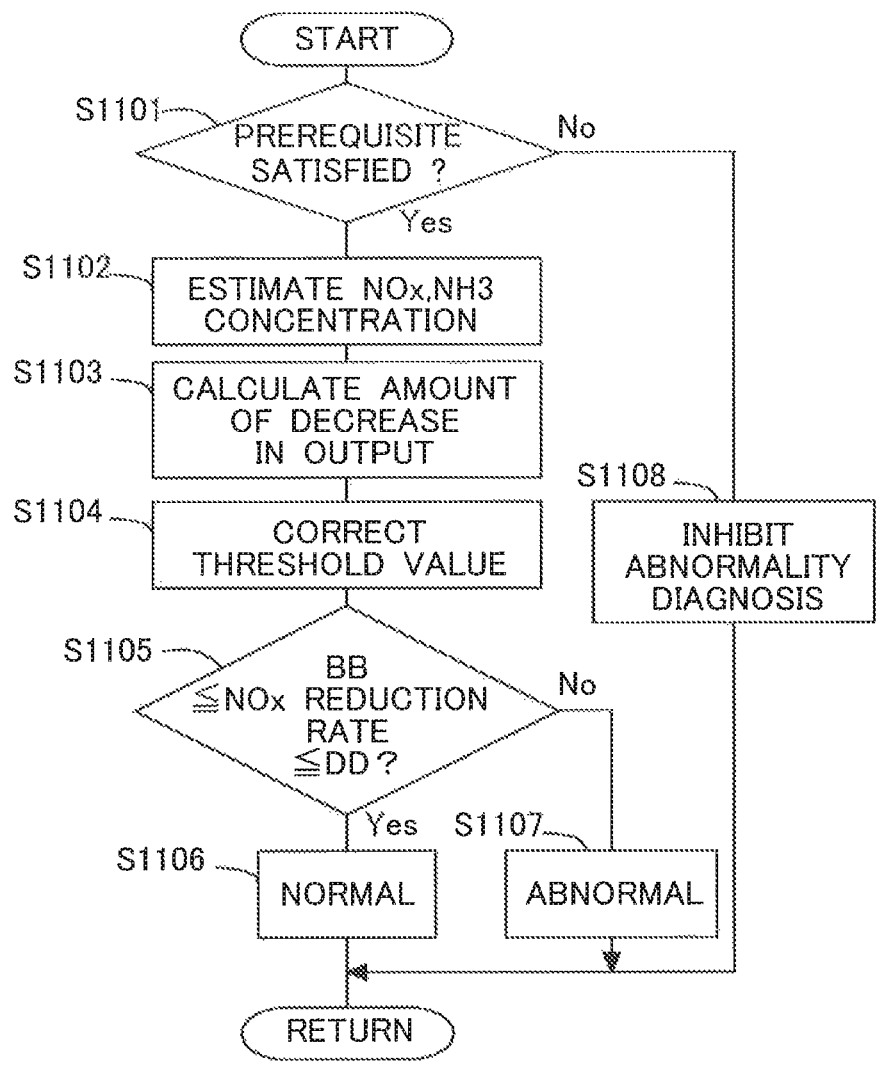
FIG. 15 is a flow chart showing a flow of abnormality diagnosis of the downstream side NOx sensor according to a third embodiment.

FIG. 15 is a flow chart showing a flow or routine of the abnormality diagnosis of the downstream side NOx sensor 8 according to this third embodiment. This routine is carried out by means of the ECU 10 at each predetermined time interval.

In step S1101, it is determined whether a prerequisite or precondition for performing the abnormality determination of the downstream side NOx sensor 8 is satisfied. In this step, it is determined whether conditions are satisfied in which the abnormality diagnosis of the downstream side NOx sensor 8 can be carried out in an accurate manner. For example, the prerequisite is that if the NOx catalyst 3 is normal, the reduction rate of NOx becomes high and NOx and ammonia are detected in the downstream side NOx sensor 8. For example, when the following conditions are all met, a determination is made that the prerequisite for carrying out the abnormality diagnosis of the downstream side NOx sensor 8 has been satisfied. The conditions are as follows: the NOx catalyst 3 has been activated; the downstream side NOx sensor 8 has been activated; and the warming of the internal combustion engine 1 has been completed. The activation or temperature of the NOx catalyst 3 can be detected by the temperature sensor 9. Also, whether the downstream side NOx sensor 8 has been activated can be determined by using well-known techniques. In cases where an affirmative determination is made in step S1101, the routine goes to step S1102, whereas in cases where a negative determination is made, the routine goes to step S1108.

In step S1102, the concentrations of NOx and ammonia flowing out of the NOx catalyst 3 are estimated. These concentrations of NOx and ammonia are values which are obtained based on the operating state of the internal combustion engine 1, etc. Here, note that in this third embodiment, the ECU 10, which carries out the processing of step S1102, corresponds to a controller in the present invention.

In step S1103, the amount of decrease in the output of the downstream side NOx sensor 8 is calculated. This amount of decrease in the sensor output is calculated based on the concentrations of NOx and ammonia estimated in step S1102, according to the above-mentioned expression 4.

Here, note that the expression 4 as well as k1, k2 and k3 have been obtained in advance by experiments, simulations, or the like, and stored in the ECU 10. Here, note that in this third embodiment, the ECU 10, which carries out the processing of step S1103, corresponds to a controller in the present invention.

In step S1104, the lower limit threshold value and the upper limit threshold value, which are used at the time of the abnormality diagnosis of the downstream side NOx sensor 8, are corrected based on the amount of decrease in the output of the downstream side NOx sensor 8 calculated in step S1103. The lower limit threshold value AA before correction and the upper limit threshold value CC before correction have been obtained in advance by experiments, simulations, or the like. Then, the lower limit threshold value BB after correction can be calculated by adding the amount of rise in the NOx reduction rate calculated based on the amount of decrease in the output of the downstream side NOx sensor 8 to the lower limit threshold value AA before correction. Also, the upper limit threshold value DD after correction can be calculated by adding the amount of rise in the NOx reduction rate calculated based on the amount of decrease in the output of the downstream side NOx sensor 8 to the upper limit threshold value CC before correction.

In step S1105, it is determined whether the NOx reduction rate calculated based on the output value of the downstream side NOx sensor 8 is equal to or larger than the lower limit threshold value BB after correction, and at the same time is equal to or less than the upper limit threshold value DD after correction. That is, the abnormality diagnosis of the downstream side NOx sensor 8 is carried out. In cases where an affirmative determination is made in step S1105, the routine advances to step S1106, in which a determination is made that the downstream side NOx sensor 8 is normal. On the other hand, in cases where a negative determination is made in step S1105, the routine advances to step S1107, in which a determination is made that the downstream side NOx sensor 8 is abnormal. Here, note that in this third embodiment, the ECU 10, which carries out the processing of step S1104, corresponds to the controller in the present invention, and the ECU 10, which carries out the processing of steps S1105, S1106 and S1107, corresponds to the controller in the present invention.

On the other hand, in step S1108, the situation is not suitable for the abnormality diagnosis of the downstream side NOx sensor 8, so the abnormality diagnosis of the downstream side NOx sensor 8 is inhibited. That is, the abnormality diagnosis of the downstream side NOx sensor 8 is not carried out. The condition that abnormality diagnosis is not carried out includes, for example, a case where the ECU 10 reads in the output value of the downstream side NOx sensor 8, but does not carry out abnormality diagnosis with the use of this output value. In addition, the condition of not carrying out abnormality diagnosis also includes, for example, a case where the ECU 10 carries out abnormality diagnosis based on the output value of the downstream side NOx sensor 8, but cancels the result of this diagnosis. Moreover, the condition of not carrying out abnormality diagnosis further includes, for example, a case where the ECU 10 does not read in the output value of the downstream side NOx sensor 8.

Here, note that in the above-mentioned explanation, the lower limit threshold value and the upper limit threshold value are corrected by being raised or increased by the amount of rise in the NOx reduction rate calculated based on the amount of decrease in the output of the downstream side NOx sensor 8, but instead of this, the NOx reduction rate calculated based on the output value of the downstream side NOx sensor 8 may be corrected by being decreased by the amount of rise in the NOx reduction rate. Then, in cases where the NOx reduction rate after correction is equal to or larger than the lower limit threshold value AA before correction, and at the same time, is equal to or less than the upper limit threshold value CC before correction, it may be diagnosed that the downstream side NOx sensor 8 is normal. On the other hand, in cases where the NOx reduction rate after correction is less than the lower limit threshold value AA before correction, or is larger than the upper limit threshold value CC before correction, it may be diagnosed that the downstream side NOx sensor 8 is abnormal. In such a case, in the above-mentioned step S1104, the NOx reduction rate is corrected, instead of correcting the threshold values. In addition, in step S1105, the NOx reduction rate after correction need only be compared with the lower limit threshold value AA before correction and the upper limit threshold value CC before correction.

Here, note that the abnormality diagnosis of the downstream side NOx sensor 8 according to this third embodiment can be carried out, even in a situation where ammonia flows out of the NOx catalyst 3. Accordingly, abnormality diagnosis can be carried out, even in cases where a reducing agent is supplied to the NOx catalyst 3. In addition, when the temperature of the NOx catalyst 3 goes up, the ammonia adsorbed to the NOx catalyst 3 may desorb from the NOx catalyst 3, and flow out of the NOx catalyst 3. Even in such a case, the abnormality diagnosis of the downstream side NOx sensor 8 can be carried out.

Further, the abnormality diagnosis of the downstream side NOx sensor 8 according to this embodiment can also be used, in cases where ammonia does not exist in the exhaust gas. In this case, there is considered to be no decrease in the output value of the downstream side NOx sensor 8.

Here, note that in the above explanation, in cases where the NOx reduction rate is equal to or larger than the lower limit threshold value, and at the same time, is equal to or less than the upper limit threshold value, it is diagnosed that the downstream side NOx sensor 8 is normal, whereas in cases where the NOx reduction rate is smaller than the lower limit threshold value or larger than the upper limit threshold value, it is diagnosed that the downstream side NOx sensor 8 is abnormal. However, instead of this, in cases where the NOx reduction rate is equal to or larger than the lower limit threshold value, it may be diagnosed that the downstream side NOx sensor 8 is normal, whereas in cases where the NOx reduction rate is smaller than the lower limit threshold value, it may be diagnosed that the downstream side NOx sensor 8 is abnormal. That is, in this case, it is not necessary to set the upper limit threshold value. On the other hand, even in cases where the NOx reduction rate is larger than the upper limit threshold value, it may be diagnosed that the downstream side NOx sensor 8 is normal. In cases where only an abnormality should be diagnosed in which the output value of the downstream side NOx sensor 8 increases, it is sufficient to compare the NOx reduction rate with the lower limit threshold value. In this case, the lower limit threshold value is corrected by adding the amount of rise in the NOx reduction rate to the lower limit threshold value, or the NOx reduction rate is corrected by subtracting the amount of rise in the NOx reduction rate from the NOx reduction rate calculated based on the actual output value of the downstream side NOx sensor 8.

Similarly, in cases where the NOx reduction rate is equal to or less than the upper limit threshold value, it may be diagnosed that the downstream side NOx sensor 8 is normal, whereas in cases where the NOx reduction rate is larger than the upper limit threshold value, it may be diagnosed that the downstream side NOx sensor 8 is abnormal. That is, in this case, it is not necessary to set the lower limit threshold value. On the other hand, even in cases where the NOx reduction rate is smaller than the lower limit threshold value, it may be diagnosed that the downstream side NOx sensor 8 is normal. In cases where only an abnormality should be diagnosed in which the output value of the downstream side NOx sensor 8 decreases, it is sufficient to compare the NOx reduction rate with the upper limit threshold value. In this case, the upper limit threshold value is corrected by adding the amount of rise in the NOx reduction rate to the upper limit threshold value, or the NOx reduction rate is corrected by subtracting the amount of rise in the NOx reduction rate from the NOx reduction rate calculated based on the actual output value of the downstream side NOx sensor 8.

Here, note that in this third embodiment, the lower limit threshold value and the upper limit threshold value are corrected by adding the amount of decrease in the output of the downstream side NOx sensor 8 to the lower limit threshold value and the upper limit threshold value, respectively, but instead of this, the lower limit threshold value and the upper limit threshold value may be corrected by multiplying the lower limit threshold value and the upper limit threshold value by a correction coefficient based on the amount of decrease in the output of the downstream side NOx sensor 8, respectively. In addition, in the case of correcting the NOx reduction rate, the NOx reduction rate may be corrected by multiplying it by a correction coefficient.

As described above, in this third embodiment, the accuracy in the abnormality diagnosis can be improved by carrying out the abnormality diagnosis of the downstream side NOx sensor 8 in consideration of the fact that the output value of the downstream side NOx sensor 8 is decreased due to the reaction of NOx and ammonia in the downstream side NOx sensor 8.

Fourth Embodiment

In the third embodiment, by correcting the lower limit threshold value and the upper limit threshold value according to the amount of rise in the NOx reduction rate, the abnormality diagnosis of the downstream side NOx sensor 8 is carried out. On the other hand, in this fourth embodiment, based on the amount of rise in the NOx reduction rate, it is determined whether the abnormality diagnosis of the downstream side NOx sensor 8 is carried out.

Here, in cases where the abnormality diagnosis of the downstream side NOx sensor 8 is carried out by comparing the NOx reduction rate calculated based on the output value of the downstream side NOx sensor 8 with the lower limit threshold value and the upper limit threshold value, the larger the amount of decrease in the output of the downstream side NOx sensor 8, the larger becomes the amount of rise in the NOx reduction rate, and the larger become the lower limit threshold value and the upper limit threshold value. For example, when the upper limit threshold value becomes too large, the NOx reduction rate can become smaller than the upper limit threshold value, even if the downstream side NOx sensor 8 is abnormal. That is, there is a fear that even if the downstream side NOx sensor 8 is abnormal, it may be diagnosed that the downstream side NOx sensor 8 is normal. On the other hand, when the lower limit threshold value becomes too large, the NOx reduction rate can become smaller than the lower limit threshold value, even if the downstream side NOx sensor 8 is normal. That is, there is a fear that even if the downstream side NOx sensor 8 is normal, it may be diagnosed that the downstream side NOx sensor 8 is abnormal.

However, in cases where the amount of decrease in the output of the downstream side NOx sensor 8 is small, the output value of the downstream side NOx sensor 8 becomes a value close to a value corresponding to the actual concentration, and hence, it is not necessary to correct the lower limit threshold value and the upper limit threshold value. On the other hand, when the amount of decrease in the output of the downstream side NOx sensor 8 becomes large, the accuracy of the diagnosis becomes low, as mentioned above. Accordingly, by carrying out the abnormality diagnosis of the downstream side NOx sensor 8 only in cases where the amount of rise in the NOx reduction rate is equal to or less than a predetermined amount, the reduction in accuracy of the abnormality diagnosis can be suppressed. The predetermined amount is an upper limit value of the amount of rise in the NOx reduction rate in the case where the accuracy in the abnormality diagnosis of the downstream side NOx sensor 8 becomes within the allowable range. This predetermined amount may be obtained in advance through experiments, simulations, or the like. In addition, in cases where the amount of rise in the NOx reduction rate is larger than the predetermined amount, incorrect or wrong diagnosis can be suppressed by inhibiting the abnormality diagnosis of the downstream side NOx sensor 8.

Figure 16:
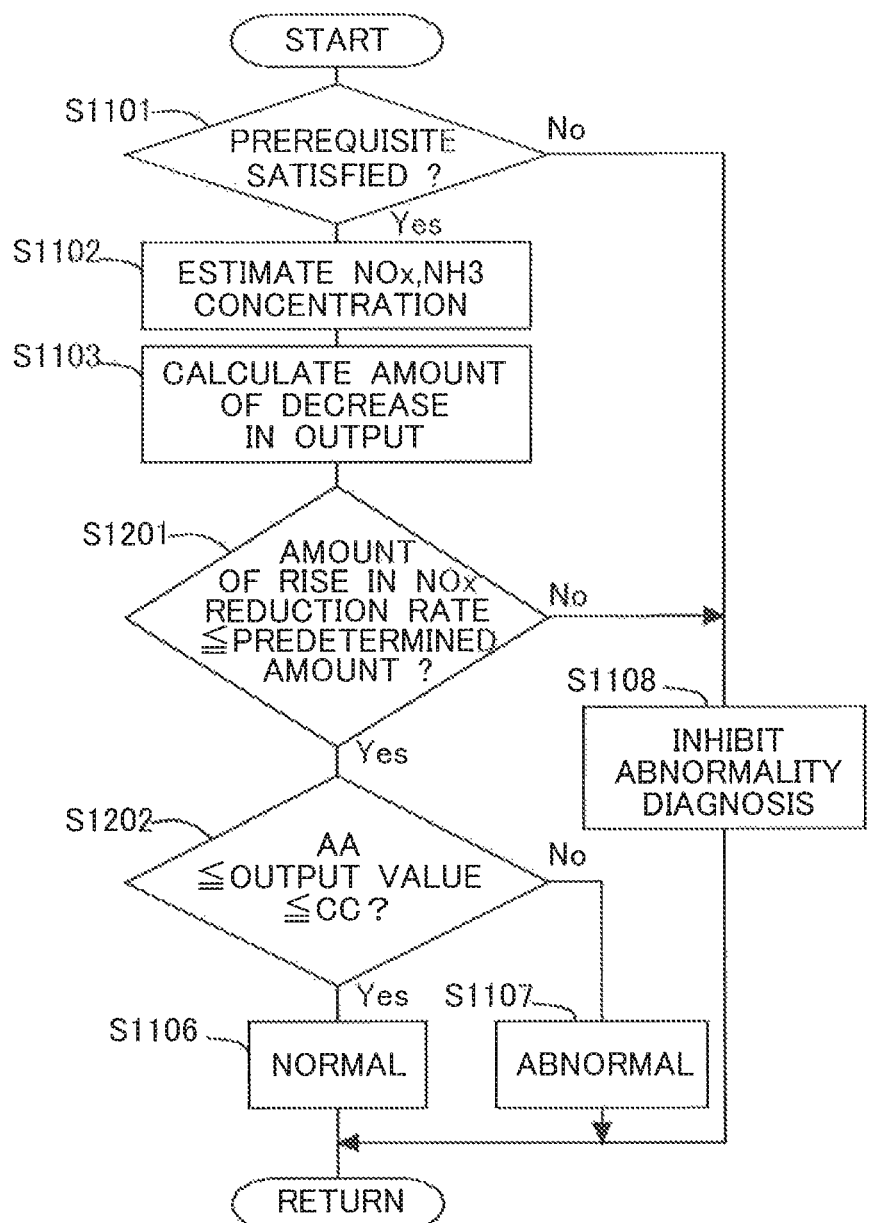
FIG. 16 is a flow chart showing a flow of abnormality diagnosis of the downstream side NOx sensor according to a fourth embodiment.

FIG. 16 is a flow chart showing a flow or routine of the abnormality diagnosis of the downstream side NOx sensor 8 according to this fourth embodiment. This routine is carried out by means of the ECU 10 at each predetermined time interval. Here, note that for those steps in which the same processing as in the above-mentioned routine of the third embodiment is carried out, the same symbols are attached and an explanation thereof is omitted. In this routine, the processing of step S1201 is carried out in place of the processing of step S1104 in the above-mentioned routine of the third embodiment.

That is, in this fourth embodiment, the processing of step S1201 is carried out after step S1103. In step S1201, it is determined whether the amount of rise in the NOx reduction rate calculated based on the amount of decrease in the output of the downstream side NOx sensor 8 calculated in step S1103 is equal to or less than a predetermined amount. The predetermined amount is an upper limit value of the amount of rise in the output of the downstream side NOx sensor 8 in the case where the accuracy in the abnormality diagnosis of the downstream side NOx sensor 8 becomes within the allowable range. In cases where an affirmative determination is made in step S1201, the routine goes to step S1202, whereas in cases where a negative determination is made, the routine goes to step S1108.

In step S1202, it is determined whether the NOx reduction rate is equal to or more than the lower limit threshold value AA before correction, and at the same time is equal to or less than the upper limit threshold value CC before correction. That is, the abnormality diagnosis of the NOx catalyst 3 is carried out. In this step, a determination is made based on the lower limit threshold value AA and the upper limit threshold value CC which have not been corrected. In cases where an affirmative determination is made in step S1202, the routine advances to step S1106, in which a diagnosis is made that the NOx catalyst 3 is normal. On the other hand, in cases where a negative determination is made in step S1202, the routine advances to step S1107, in which a diagnosis is made that the NOx catalyst 3 is abnormal. Here, note that in this fourth embodiment, the ECU 10, which carries out the processing of steps S1201 and S1108, corresponds to the controller in the present invention, and the ECU 10, which carries out the processing of steps S1202, S1106 and S1107, corresponds to the controller in the present invention.

Figure 17:
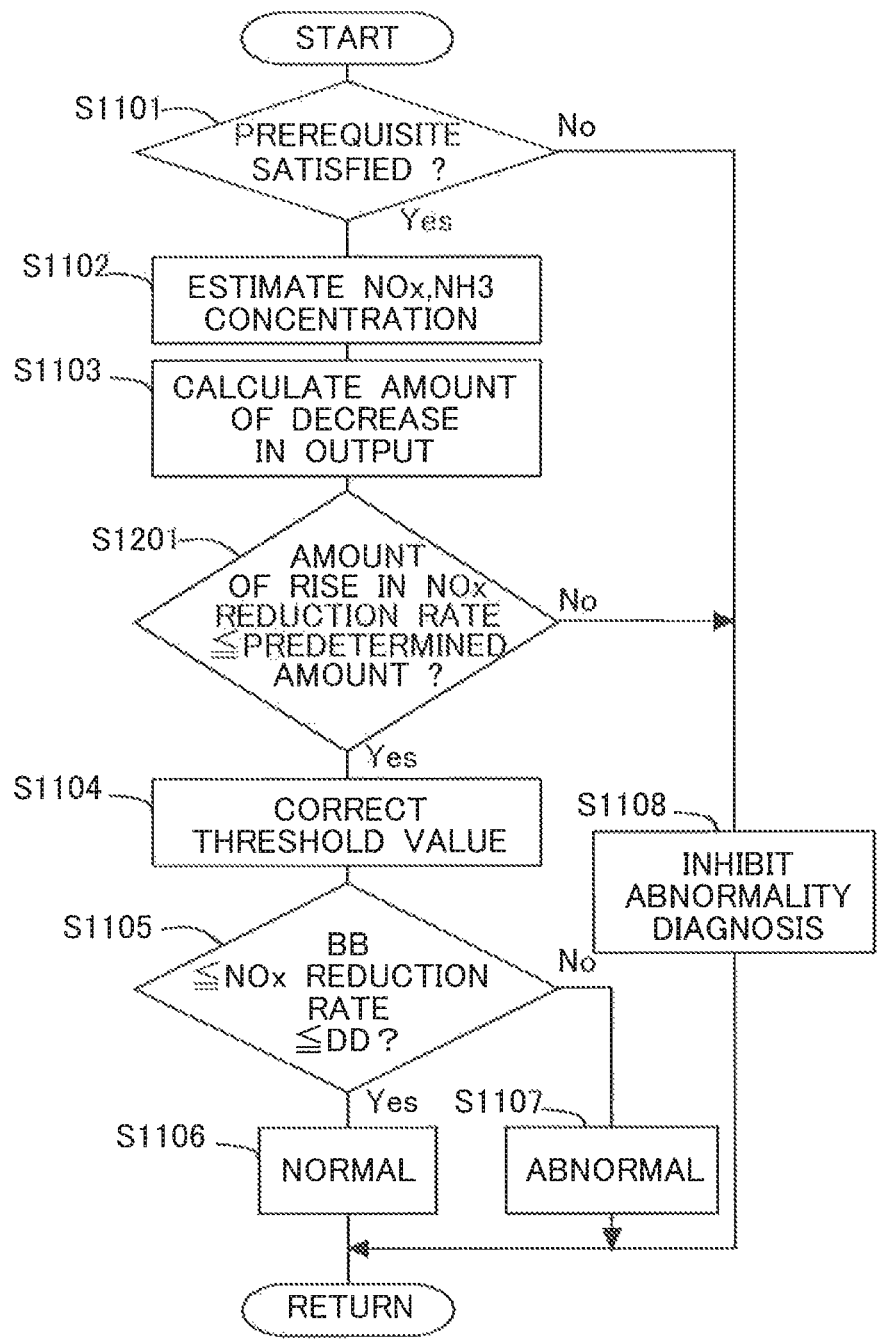
FIG. 17 is another flow chart showing a flow of abnormality diagnosis of the downstream side NOx sensor according to the fourth embodiment.

Here, note that in this fourth embodiment, the step S1104 in the above-mentioned routine of the third embodiment may also be carried out. FIG. 17 is another flow chart showing a flow or routine of the abnormality diagnosis of the downstream side NOx sensor 8 according to this fourth embodiment. This routine is carried out by means of the ECU 10 at each predetermined time interval. Here, note that for those steps in which the same processing as in the above-mentioned routine is carried out, the same symbols are attached and an explanation thereof is omitted. In this routine, the processing of step S1104 is carried out after the processing of step S1201 in the above-mentioned routine of FIG. 16. That is, in cases where an affirmative determination is made in step S1201, the routine advances to step S1104, whereas in cases where a negative determination is made, the routine advances to step S1108. In such a case, the ECU 10, which carries out the processing of step S1201, S1104 and S1108, corresponds to the controller in the present invention, and the ECU 10, which carries out the processing of steps S1105, S1106 and S1107, corresponds to the controller in the present invention.

As described above, according to this fourth embodiment, the accuracy in the abnormality diagnosis can be improved by carrying out the abnormality diagnosis of the downstream side NOx sensor 8 only when the amount of the decrease in the output of the downstream side NOx sensor 8 due to the reaction of NOx and ammonia in the downstream side NOx sensor 8 is small.

EXPLANATION OF REFERENCE NUMERALS AND CHARACTERS 1 internal combustion engine
2 exhaust passage
3 NOx selective reduction catalyst
4 injection valve
5 intake passage
6 throttle valve
7 upstream side NOx sensor
8 downstream side NOx sensor
9 temperature sensor
10 ECU
11 crank position sensor
12 accelerator opening sensor
15 air flow meter

The invention claimed is:

1. An abnormality diagnosis device for a sensor in an exhaust gas purification apparatus of an internal combustion engine, which is provided with:
an NOx selective reduction catalyst that is arranged in an exhaust passage of the internal combustion engine and uses ammonia as a reducing agent;
an injection valve configured to supply ammonia or a precursor of ammonia into an exhaust gas flowing into said NOx selective reduction catalyst, at a location upstream of said NOx selective reduction catalyst; and
a sensor that is arranged at the downstream side of said NOx selective reduction catalyst, and configured to detect NOx and ammonia in an exhaust gas flowing out of said NOx selective reduction catalyst, with the NOx and the ammonia reacting with each other therein; comprising:
a controller comprising at least one processor configured to
estimate a concentration of NOx in the exhaust gas flowing out of said NOx selective reduction catalyst;
estimate a concentration of ammonia in the exhaust gas flowing out of said NOx selective reduction catalyst;
calculate an amount of decrease in an output of said sensor due to a reaction of NOx and ammonia in said sensor, based on the NOx concentration estimated by said controller and the ammonia concentration estimated by said controller;
carry out a diagnosis of said sensor based on an output value of said sensor; and
control the diagnosis in said controller based on the amount of decrease in the output of said sensor calculated by said controller.

2. The abnormality diagnosis device for a sensor as set forth in claim 1, wherein said controller carries out an abnormality diagnosis of said sensor in cases where an amount of rise in the NOx reduction rate calculated based on the amount of decrease in the output of said sensor calculated by said controller is equal to or less than a predetermined amount, whereas said controller does not carry out an abnormality diagnosis of said sensor in cases where the amount of rise in the NOx reduction rate calculated based on the amount of decrease in the output of said sensor calculated by said controller is larger than said predetermined amount.

3. The abnormality diagnosis device for a sensor as set forth in claim 1, wherein said controller diagnoses that said sensor is normal, in cases where the NOx reduction rate calculated based on the output value of said sensor is equal to or larger than a predetermined lower limit threshold value, and at the same time is equal to or less than a predetermined upper limit threshold value, which are decided based on the NOx concentration estimated by said controller and the ammonia concentration estimated by said controller, whereas said controller diagnoses that said sensor is abnormal, in cases where the NOx reduction rate calculated based on the output value of said sensor is smaller than said predetermined lower limit threshold value, or in cases where the NOx reduction rate calculated based on the output value of said sensor is larger than said predetermined upper limit threshold value;
wherein said controller corrects at least one of said lower limit threshold value and said upper limit threshold value, based on the amount of decrease in the output of said sensor calculated by said controller.

4. The abnormality diagnosis device for a sensor as set forth in claim 1, wherein said controller diagnoses that said sensor is normal, in cases where the NOx reduction rate calculated based on the output value of said sensor is equal to or larger than a predetermined lower limit threshold value, and at the same time is equal to or less than a predetermined upper limit threshold value, which are calculated based on the NOx concentration estimated by said controller and the ammonia concentration estimated by said controller, whereas said controller diagnoses that said sensor is abnormal, in cases where the NOx reduction rate calculated based on the output value of said sensor is smaller than said predetermined lower limit threshold value, or in cases where the NOx reduction rate calculated based on the output value of said sensor is larger than said predetermined upper limit threshold value;
wherein said controller corrects said NOx reduction rate based on the amount of decrease in the output of said sensor calculated by said controller.

5. The abnormality diagnosis device for a sensor as set forth in claim 1, wherein said controller diagnoses that said sensor is normal, in cases where the NOx reduction rate calculated based on the output value of said sensor is equal to or less than a predetermined upper limit threshold value, which is decided based on the NOx concentration estimated by said controller and the ammonia concentration estimated by said controller, whereas said controller diagnoses that said sensor is abnormal, in cases where the NOx reduction rate calculated based on the output value of said sensor is larger than said predetermined upper limit threshold value;
wherein said controller corrects said upper limit threshold value, based on the amount of decrease in the output of said sensor calculated by said controller.

6. The abnormality diagnosis device for a sensor as set forth in claim 1, wherein said controller diagnoses that said sensor is normal, in cases where the NOx reduction rate calculated based on the output value of said sensor is equal to or more than a predetermined lower limit threshold value, which is decided based on the NOx concentration estimated by said controller and the ammonia concentration estimated by said controller, whereas said controller diagnoses that said sensor is abnormal, in cases where the NOx reduction rate calculated based on the output value of said sensor is smaller than said predetermined lower limit threshold value;
wherein said controller corrects said lower limit threshold value, based on the amount of decrease in the output of said sensor calculated by said controller.

7. The abnormality diagnosis device for a sensor as set forth in claim 1, wherein said controller diagnoses that said sensor is normal, in cases where the NOx reduction rate calculated based on the output value of said sensor is equal to or less than a predetermined upper limit threshold value, which is calculated based on the NOx concentration estimated by said controller and the ammonia concentration estimated by said controller, whereas said controller diagnoses that said sensor is abnormal, in cases where the NOx reduction rate calculated based on the output value of said sensor is larger than said predetermined upper limit threshold value;
wherein said controller corrects said NOx reduction rate based on the amount of decrease in the output of said sensor calculated by said controller.

8. The abnormality diagnosis device for a sensor as set forth in claim 1, wherein said controller diagnoses that said sensor is normal, in cases where the NOx reduction rate calculated based on the output value of said sensor is equal to or more than a predetermined lower limit threshold value, which is calculated based on the NOx concentration estimated by said controller and the ammonia concentration estimated by said controller, whereas said controller diagnoses that said sensor is abnormal, in cases where the NOx reduction rate calculated based on the output value of said sensor is smaller than said predetermined lower limit threshold value;
wherein said controller corrects said NOx reduction rate based on the amount of decrease in the output of said sensor calculated by said controller.

9. The abnormality diagnosis device for a sensor as set forth in claim 7, wherein said controller corrects the output value of said sensor by subtracting the amount of rise in the NOx reduction rate calculated based on said amount of decrease in the sensor output from the NOx reduction rate calculated based on the output value of said sensor.

10. The abnormality diagnosis device for a sensor as set forth in claim 1, wherein said controller carries out an abnormality diagnosis of said sensor in cases where the amount of decrease in the output of said sensor calculated by said controller is equal to or less than a predetermined amount, whereas said controller does not carry out an abnormality diagnosis of said sensor in cases where the amount of decrease in the output of said sensor calculated by said controller is larger than said predetermined amount.

11. The abnormality diagnosis device for a sensor as set forth in claim 1, wherein said controller diagnoses that said sensor is normal, in cases where the output value of said sensor is equal to or larger than a predetermined lower limit threshold value, and at the same time is equal to or less than a predetermined upper limit threshold value, which are decided based on the NOx concentration estimated by said controller and the ammonia concentration estimated by said controller, whereas said controller diagnoses that said sensor is abnormal, in cases where the output value of said sensor is smaller than said predetermined lower limit threshold value, or in cases where the output value of said sensor is larger than said predetermined upper limit threshold value;
wherein said controller corrects at least one of said lower limit threshold value and said upper limit threshold value, based on the amount of decrease in the output of said sensor calculated by said controller.

12. The abnormality diagnosis device for a sensor as set forth in claim 11, wherein said controller corrects at least one of said lower limit threshold value and said upper limit threshold value by subtracting said amount of decrease in the sensor output from the at least one of said lower limit threshold value and said upper limit threshold value.

13. The abnormality diagnosis device for a sensor as set forth in claim 1, wherein said controller diagnoses that said sensor is normal, in cases where the output value of said sensor is equal to or larger than the predetermined lower limit threshold value, and at the same time is equal to or less than the predetermined upper limit threshold value, which are calculated based on the NOx concentration estimated by said controller and the ammonia concentration estimated by said controller, whereas said controller diagnoses that said sensor is abnormal, in cases where the output value of said sensor is smaller than said predetermined lower limit threshold value, or in cases where the output value of said sensor is larger than said predetermined upper limit threshold value;
wherein said controller corrects the output value of said sensor, based on the amount of decrease in the output of said sensor calculated by said controller.

14. The abnormality diagnosis device for a sensor as set forth in claim 1, wherein said controller diagnoses that said sensor is normal, in cases where the output value of said sensor is equal to or larger than a predetermined lower limit threshold value, which is decided based on the NOx concentration estimated by said controller and the ammonia concentration estimated by said controller, whereas said controller diagnoses that said sensor is abnormal, in cases where the output value of said sensor is smaller than said predetermined lower limit threshold value;
wherein said controller corrects said predetermined lower limit threshold value, based on the amount of decrease in the output of said sensor calculated by said controller.

15. The abnormality diagnosis device for a sensor as set forth in claim 1, wherein said controller diagnoses that said sensor is normal, in cases where the output value of said sensor is equal to or less than a predetermined upper limit threshold value, which is decided based on the NOx concentration estimated by said controller and the ammonia concentration estimated by said controller, whereas said controller diagnoses that said sensor is abnormal, in cases where the output value of said sensor is larger than said predetermined upper limit threshold value;
wherein said controller corrects said predetermined upper limit threshold value, based on the amount of decrease in the output of said sensor calculated by said controller.

16. The abnormality diagnosis device for a sensor as set forth in claim 1, wherein said controller diagnoses that said sensor is normal, in cases where the output value of said sensor is equal to or larger than a predetermined lower limit threshold value, which is calculated based on the NOx concentration estimated by said controller and the ammonia concentration estimated by said controller, whereas said controller diagnoses that said sensor is abnormal, in cases where the output value of said sensor is smaller than said predetermined lower limit threshold value;
wherein said controller corrects the output value of said sensor, based on the amount of decrease in the output of said sensor calculated by said controller.

17. The abnormality diagnosis device for a sensor as set forth in claim 1, wherein said controller diagnoses that said sensor is normal, in cases where the output value of said sensor is equal to or less than a predetermined upper limit threshold value, which is calculated based on the NOx concentration estimated by said controller and the ammonia concentration estimated by said controller, whereas said controller diagnoses that said sensor is abnormal, in cases where the output value of said sensor is larger than said predetermined upper limit threshold value;

wherein said controller corrects the output value of said sensor, based on the amount of decrease in the output of said sensor calculated by said controller.

\* \* \* \* \*